US006958757B2

(12) United States Patent
Karlov

(10) Patent No.: US 6,958,757 B2
(45) Date of Patent: Oct. 25, 2005

(54) SYSTEMS AND METHODS FOR EFFICIENTLY DISPLAYING GRAPHICS ON A DISPLAY DEVICE REGARDLESS OF PHYSICAL ORIENTATION

(75) Inventor: Donald David Karlov, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 243 days.

(21) Appl. No.: 10/623,220

(22) Filed: Jul. 18, 2003

(65) Prior Publication Data

US 2005/0012752 A1 Jan. 20, 2005

(51) Int. Cl.[7] ................................................ G09G 5/36
(52) U.S. Cl. ...................... 345/557; 345/568; 345/658; 711/3; 711/113; 711/118; 711/134
(58) Field of Search .................... 345/557, 564–566, 345/568, 658; 711/1, 2, 3, 118–122, 113–134; 712/113

(56) References Cited

U.S. PATENT DOCUMENTS

| | | | | |
|---|---|---|---|---|
| 5,630,075 A | * | 5/1997 | Joshi et al. .................. | 711/100 |
| 6,072,507 A | * | 6/2000 | Balatsos et al. ............. | 345/569 |
| 6,188,385 B1 | | 2/2001 | Hill et al. .................... | 345/136 |
| 6,278,434 B1 | | 8/2001 | Hill et al. .................... | 345/127 |
| 6,339,426 B1 | | 1/2002 | Lui et al. ..................... | 345/467 |
| 6,342,890 B1 | | 1/2002 | Shetter ........................ | 345/467 |
| 6,356,270 B2 | * | 3/2002 | Pentkovski et al. ......... | 345/530 |
| 6,356,278 B1 | | 3/2002 | Stamm et al. .............. | 345/611 |
| 6,384,839 B1 | | 5/2002 | Paul ........................... | 345/613 |
| 2003/0151610 A1 | * | 8/2003 | Kuriakin et al. ............ | 345/589 |

* cited by examiner

*Primary Examiner*—Matthew C. Bella
*Assistant Examiner*—Mackly Monestime
(74) *Attorney, Agent, or Firm*—Woodcock Washburn LLP

(57) ABSTRACT

The method of one embodiment for the invention is for the CPU to read a subset of consecutive pixels from RAM and cache each such pixel in the WC Cache (and load corresponding blocks into the L2 Cache). These reads and loads continue until the capacity of the L2 Cache is reached, and then these blocks (a "band") are iteratively processed until the entire band in the L2 Cache has been written to the frame buffer via the WC Cache. Once this is complete, the process then "dumps" the L2 Cache (that is, it ignores the existing blocks and allows them to be naturally pushed out with subsequent loads) and the next band of consecutive pixels is read (and their blocks loaded). This process continues until the portrait-oriented graphic is entirely loaded.

30 Claims, 22 Drawing Sheets

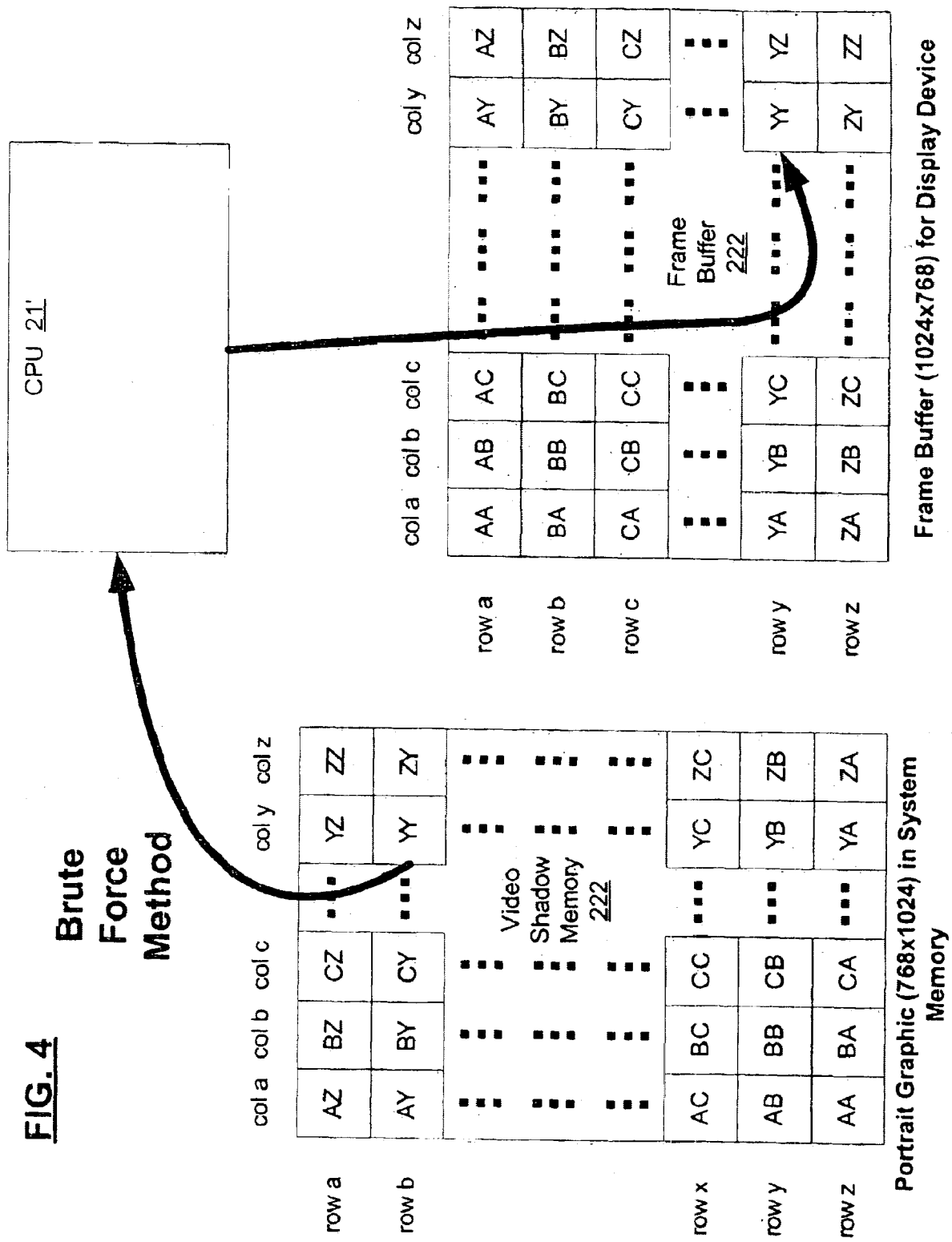
FIG. 4 Brute Force Method

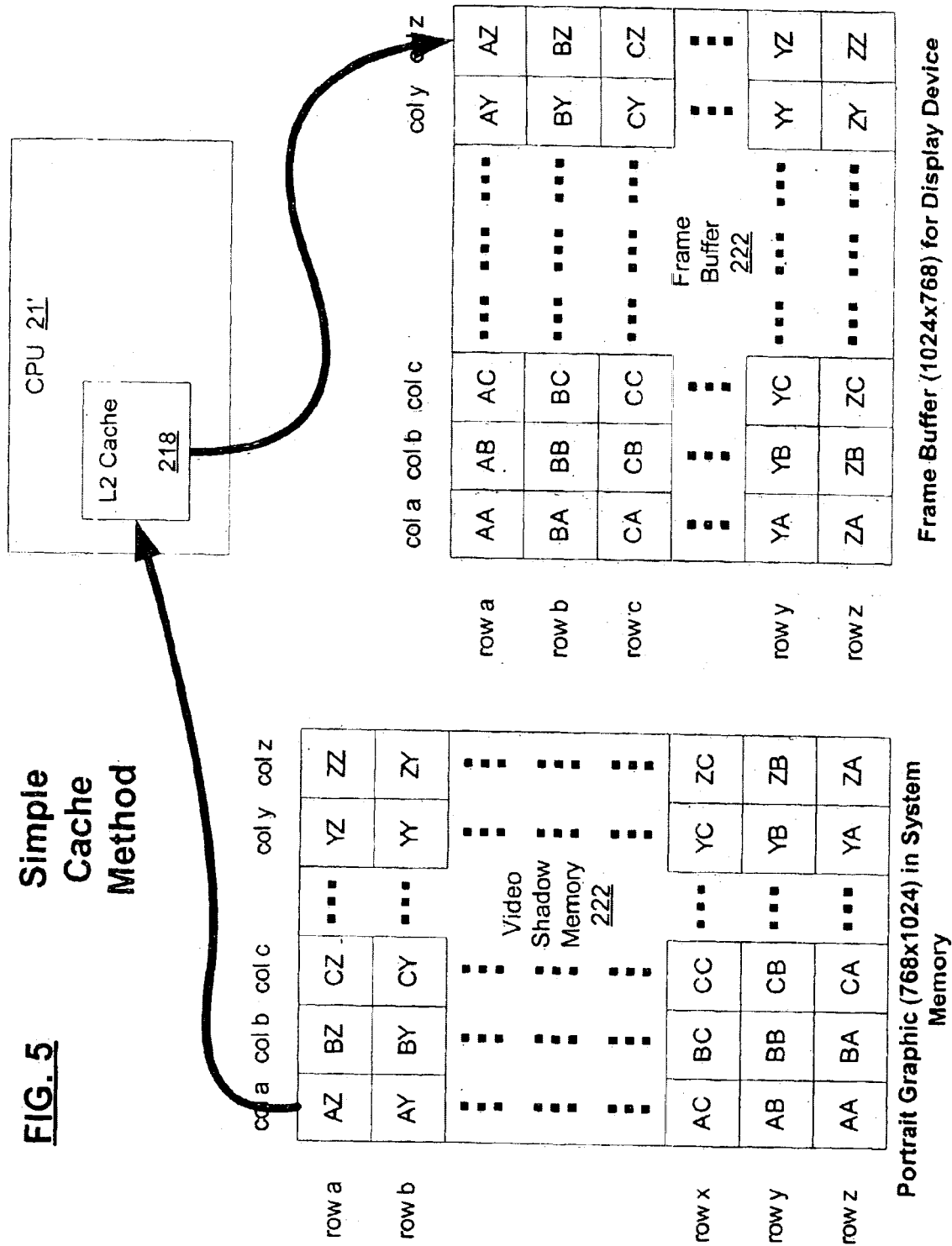

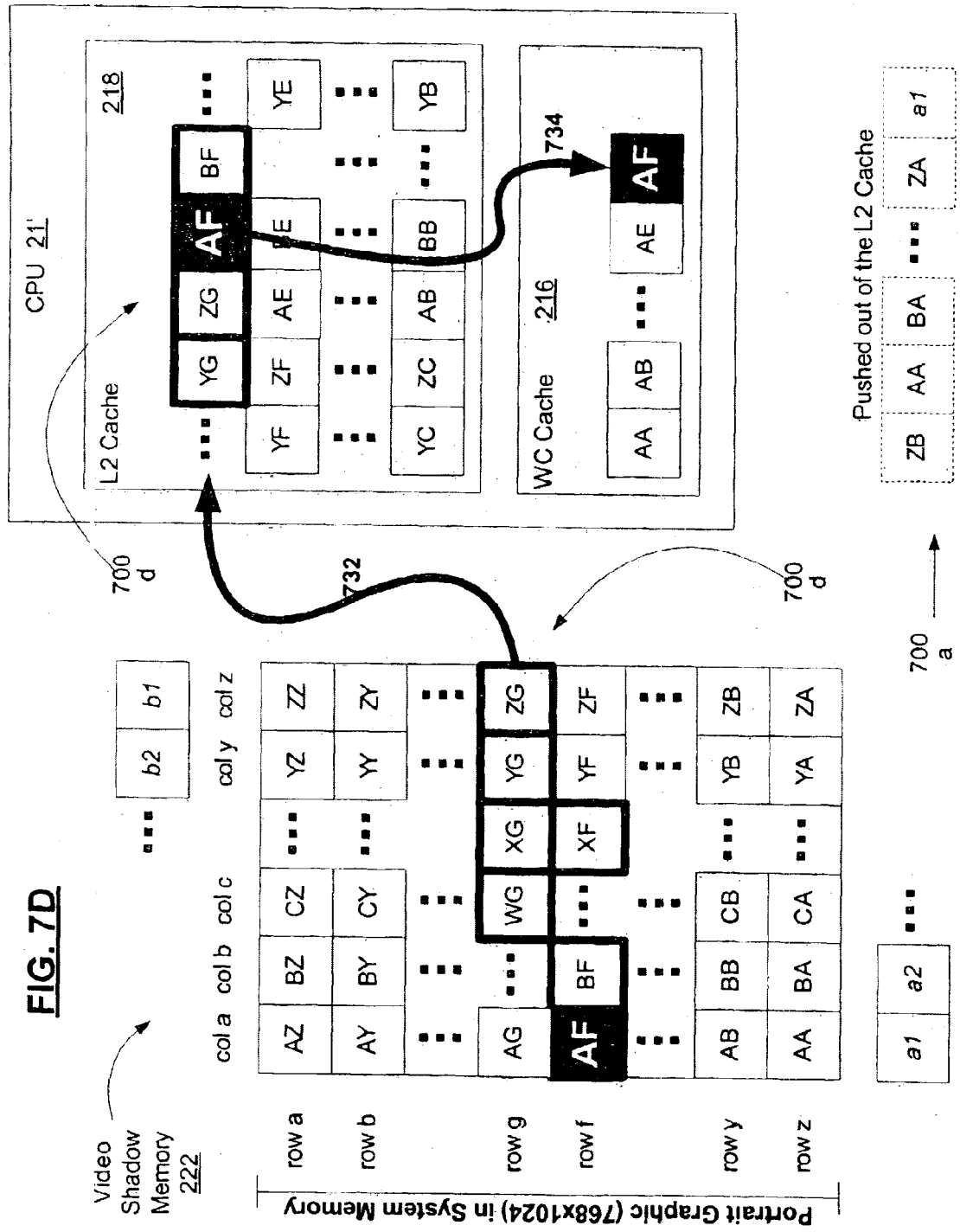

Portrait Graphic (768x1024) on Portrait-Oriented Display Device

Write-Combine Method: Rasterized Draw Pattern

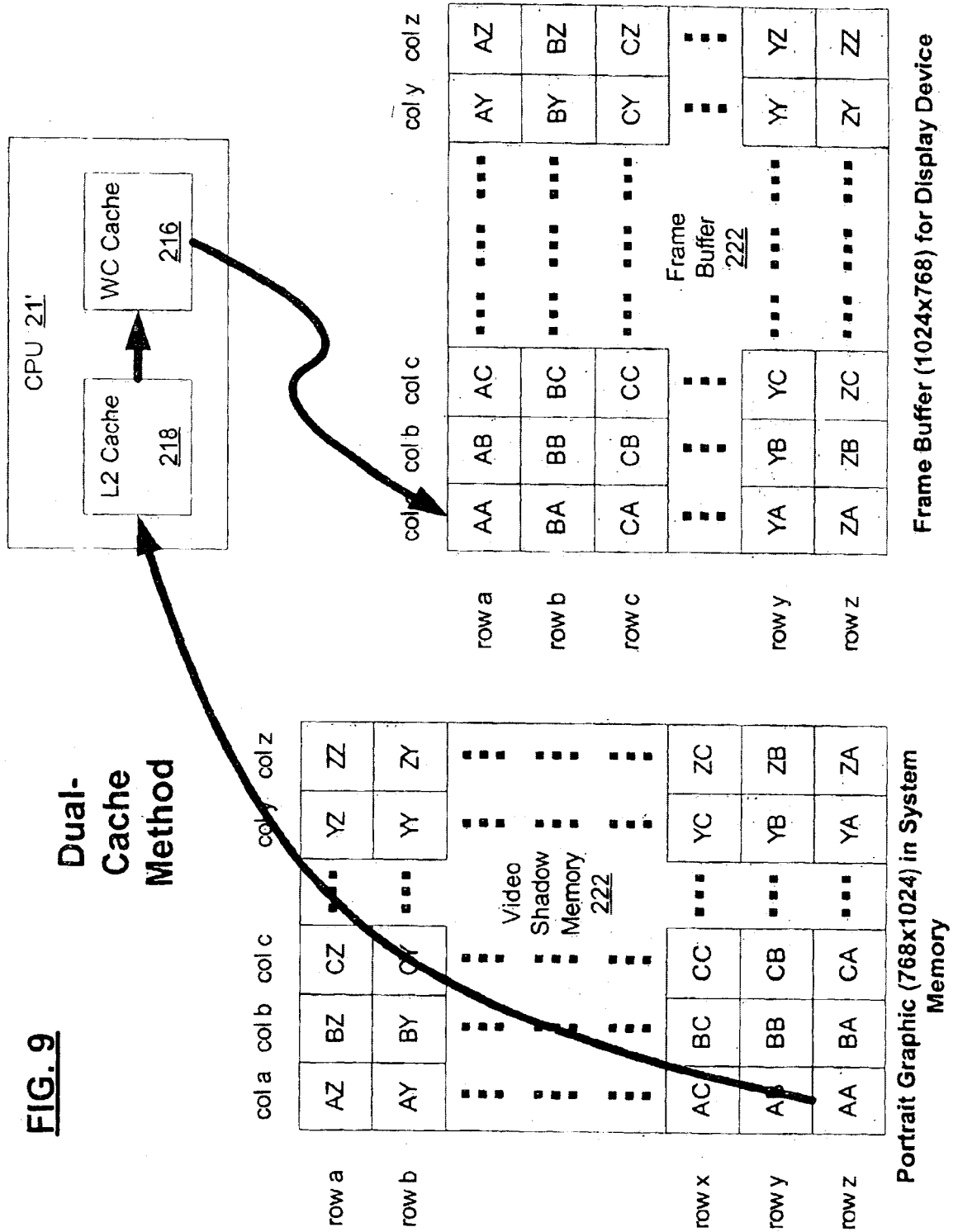

FIG. 10A
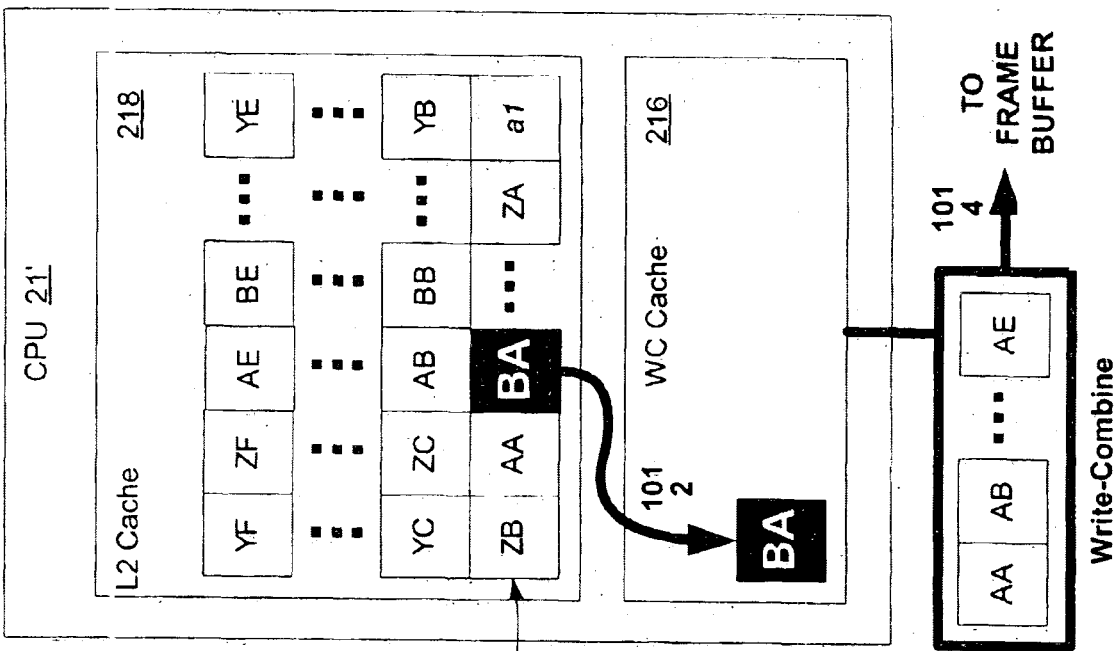
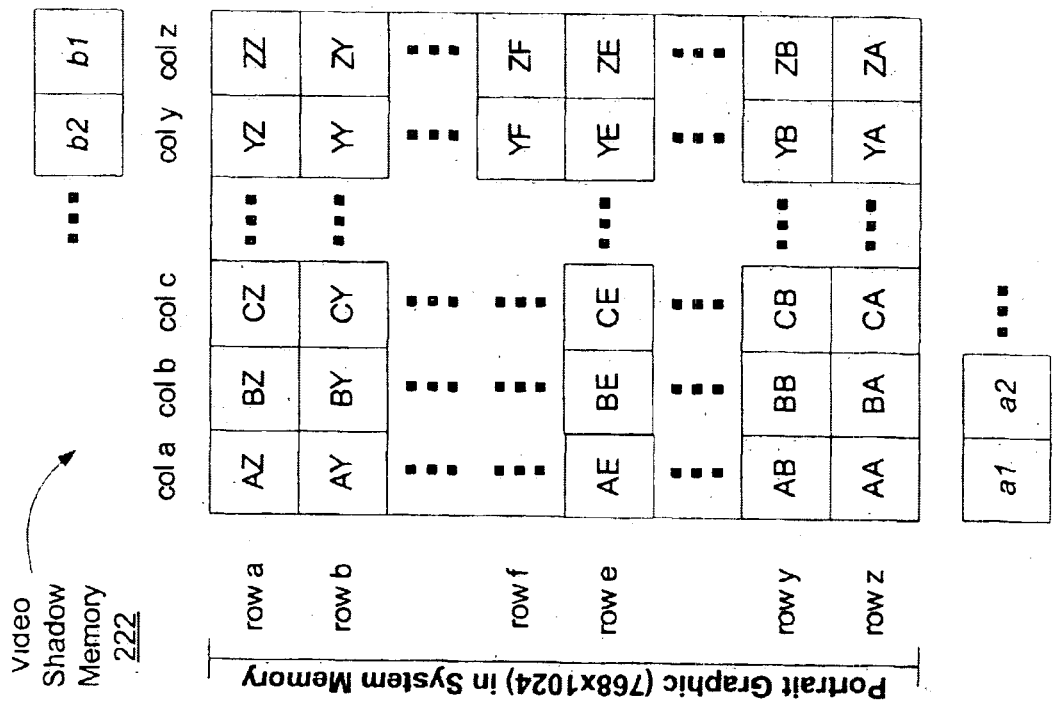

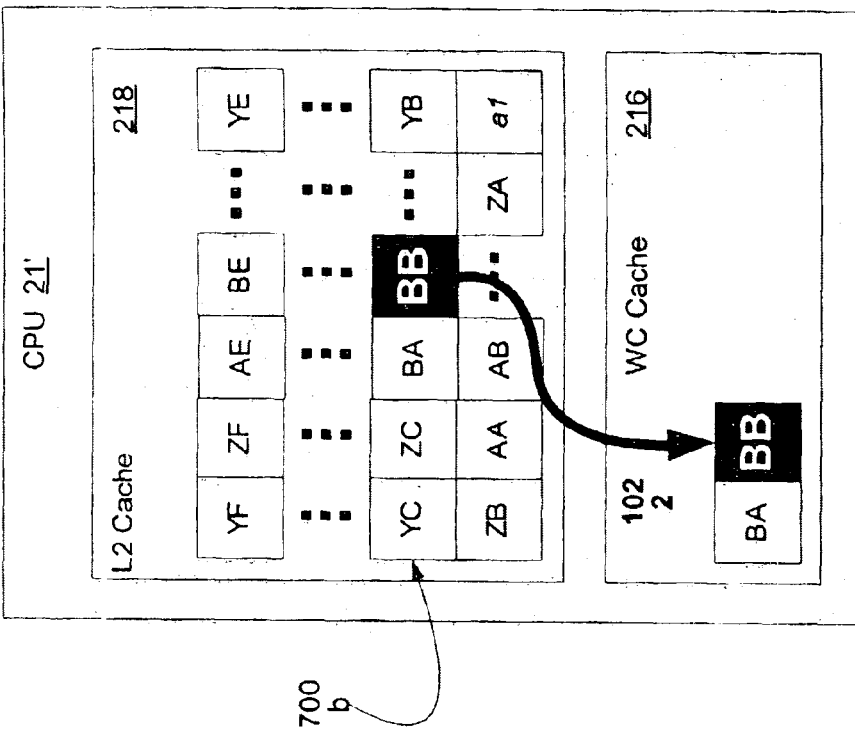
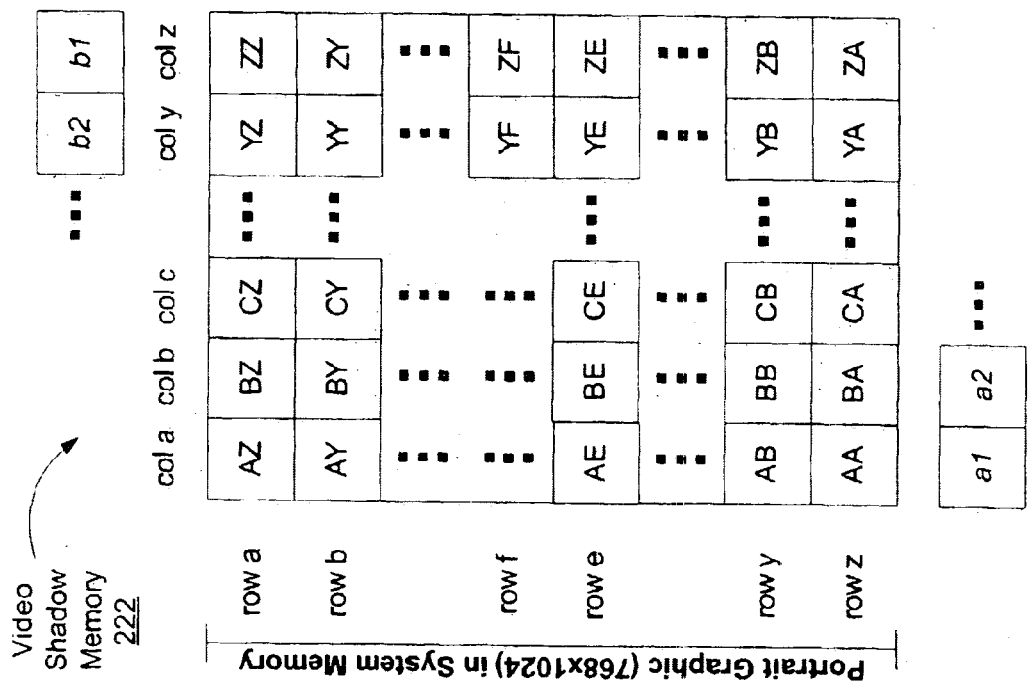
FIG. 10B

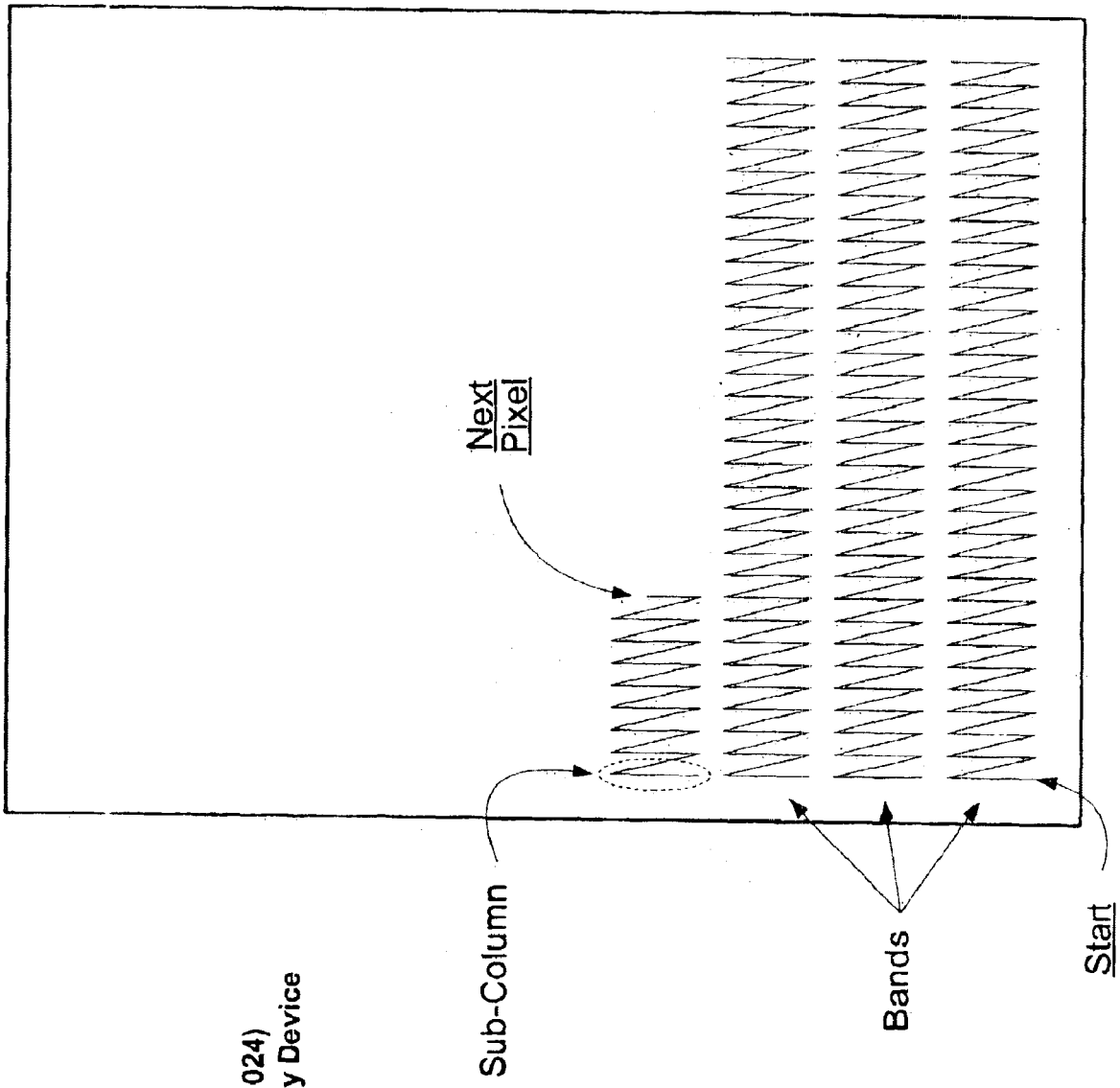

FIG. 12

ANALYSIS OF PRESENT INVENTION VERSUS EXISTING METHODS IN THE ART

General Analysis:

| | RAM Reads | FB Writes | Total "Slow" Operations |
|---|---|---|---|
| Brute Force (or GPU): | 786,432 | 786,432 | 2,359,296 |
| CPU w/ L2 Cache: | 768 | 786,432 | 1,573,632 |
| Write Combine Only (approx): | 786,432 | 768 | 787,968 |
| Write-Combine & L2 Cache Optimization (approx): | 768 | 24,576 | 49,920 |

RAM Reads = 1 slow operation
FB Writes = 2 slow operations

Assumptions for Analysis:

| | KB: | Bytes: |
|---|---|---|
| Write Combine Buffer: | 4 | 4,096 |
| Each Pixel: | 0.0039 | 4 |
| L2 Cache for Images: | 128 | 131,072 |

Total Pixels (1024x768): 786,432

*This is the amount of total L2 cache memory 'dedicated' to holding RAM Read info....

SYSTEMS AND METHODS FOR EFFICIENTLY DISPLAYING GRAPHICS ON A DISPLAY DEVICE REGARDLESS OF PHYSICAL ORIENTATION

CROSS-REFERENCE TO RELATED APPLICATIONS

This application is related by subject matter to the inventions disclosed in the following commonly assigned applications: U.S. patent application Ser. No. 10/622,749, filed on even date herewith, entitled "SYSTEMS AND METHODS FOR UPDATING A FRAME BUFFER BASED ON ARBITRARY GRAPHICS CALLS"; and U.S. patent application Ser. No. 10/622,597, filed on even date herewith, entitled "SYSTEMS AND METHODS FOR EFFICIENTLY UPDATING COMPLEX GRAPHICS IN A COMPUTER SYSTEM BY BY-PASSING THE GRAPHICAL PROCESSING UNIT AND RENDERING GRAPHICS IN MAIN MEMORY".

FIELD OF THE INVENTION

The present invention relates generally to the field of computer graphics, and more particularly to the efficient rendering and updating of graphics to a display device. The present invention also addresses shortcomings for certain orientable display devices which might be interchangeably viewed in a landscape orientation and a portrait orientation.

BACKGROUND OF THE INVENTION

The prevalent method in the art for remapping portrait-oriented graphics rendered in system memory to the frame buffer has been to maximally leverage the benefits of write-combine (WC) cache. When present, a WC Cache enables the CPU to batch together several write operations to consecutive memory addresses in the frame buffer (the target location). However, one important shortcoming that has gone largely unnoticed in the art regarding the write-combine method is that, in its quest to maximally exploit the WC Cache, the write-combine method completely ignores the L2 Cache, and the L2 Cache becomes the bottleneck for the process of transposing portrait-oriented graphics rendered in main memory to the frame buffer. Consequently, even using the WC Cache, displaying portrait-oriented graphics is too slow and cumbersome for optimized use with devices that permit portrait oriented display utilization and/or inverted landscape orientation (such as, for example, Tablet PCs). What is needed in the art is a more efficient approach to updating graphics on a display device regardless of orientation and, in particular, for reorientation of a display device into portrait mode. The present invention addresses these shortcomings.

SUMMARY OF THE INVENTION

The method of one embodiment for the invention is for the CPU to read a subset of consecutive pixels (which, initially, is the first subset of consecutive pixels) from RAM and cache each such pixel in the WC Cache. This "read" operation, in turn, automatically results in the loading of these pixels' corresponding blocks into the L2 Cache. These reads and loads continue until the capacity of the L2 Cache is reached ("full") and these blocks thus loaded together form a vertical "band" of pixels when drawn on the screen of the display device. Once the L2 Cache is "full," the CPU then iteratively processes the next pixels out of each block until the entire band in the L2 Cache has been written to the frame buffer via the WC Cache. Once this is complete, the process then "dumps" the L2 Cache (that is, it ignores the existing blocks and allows them to be naturally pushed out with subsequent loads) and the next band of consecutive pixels is read (and their blocks loaded). This process continues until the portrait-oriented graphic is entirely loaded.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4 is a block diagram illustrating the brute force method of copying a portrait-oriented graphic from system memory to the landscape-oriented frame buffer;

FIG. 5 is a block diagram illustrating the simple cache method of copying a portrait-oriented graphic from system memory to the landscape-oriented frame buffer;

FIG. 7D is a block diagram illustrating the operation of the write-combine method wherein an (n+1)th pixel (AF) is read by the CPU and, as a result, the first block is pushed out of the L2 Cache;

FIG. 9 is a block diagram illustrating the dual-cache method of copying a portrait-oriented graphic from system memory to the landscape-oriented frame buffer;

FIG. 10A is a block diagram illustrating the operation of the dual-cache method wherein, after reading the nth pixel (AE), the CPU then begins processing the sub-columns of other pixels already resident in the L2 Cache (requiring no L2 Cache load but, instead, a WC Cache write to the frame buffer) by reading the first pixel (BA) in the second sub-column;

FIG. 10B is a block diagram illustrating the operation of the dual-cache method wherein, after reading the first pixel in the second sub-column (BA), reading the second pixel (BB) in the second sub-column (requiring neither a L2 Cache load nor a WC Cache write);

FIG. 11C is a block diagram illustrating the rasterized pattern of the pixels as drawn (by the dual-cache method) on the display device in a portrait orientation;

FIG. 12 is matrix illustrating rough estimates of performance gains based on the "slow operation" presumptions to highlight the benefits of the dual-cache method compared to the write-combine method.

DETAILED DESCRIPTION OF ILLUSTRATIVE EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
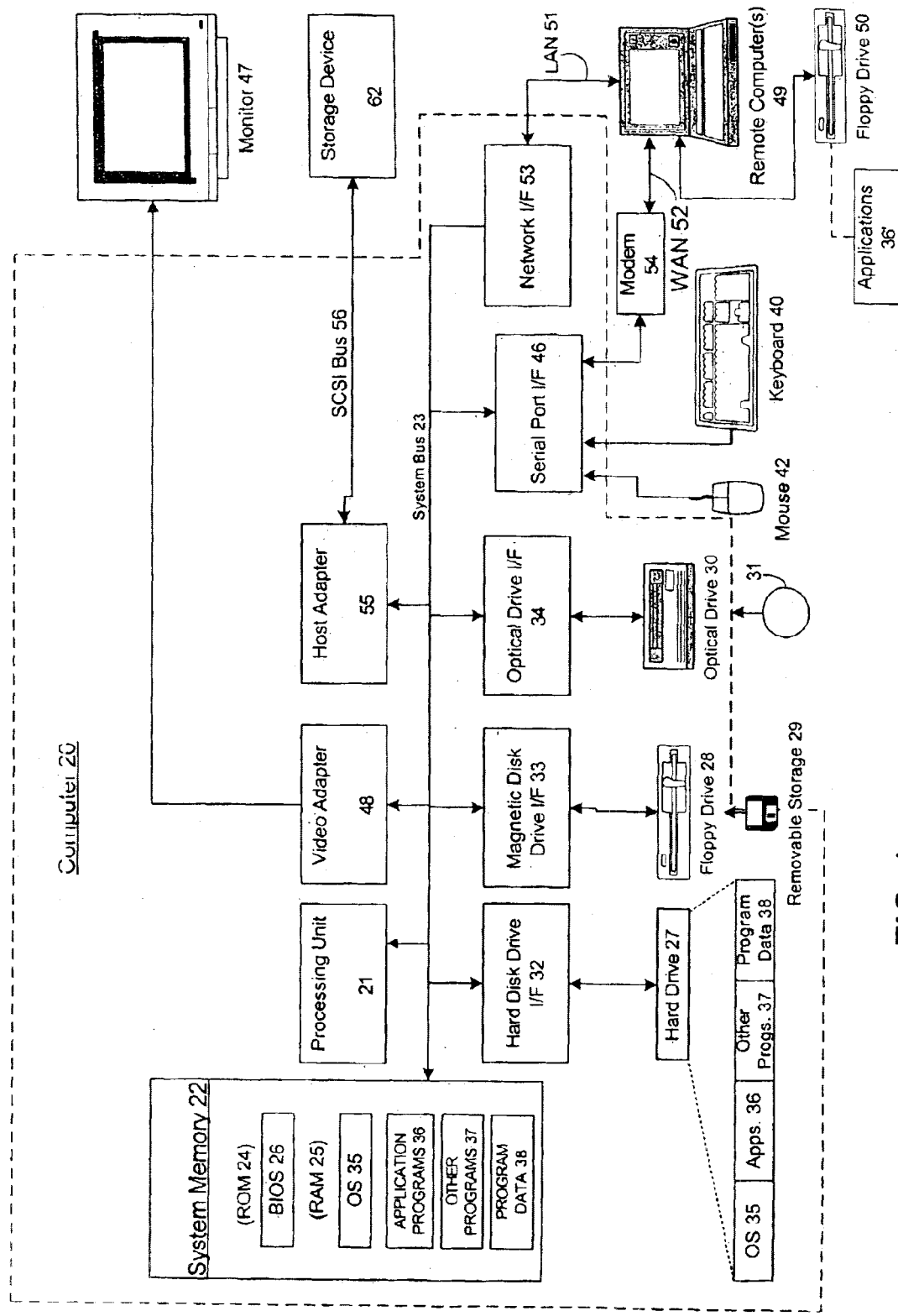
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Graphics Processing Subsystems

Figure 2:
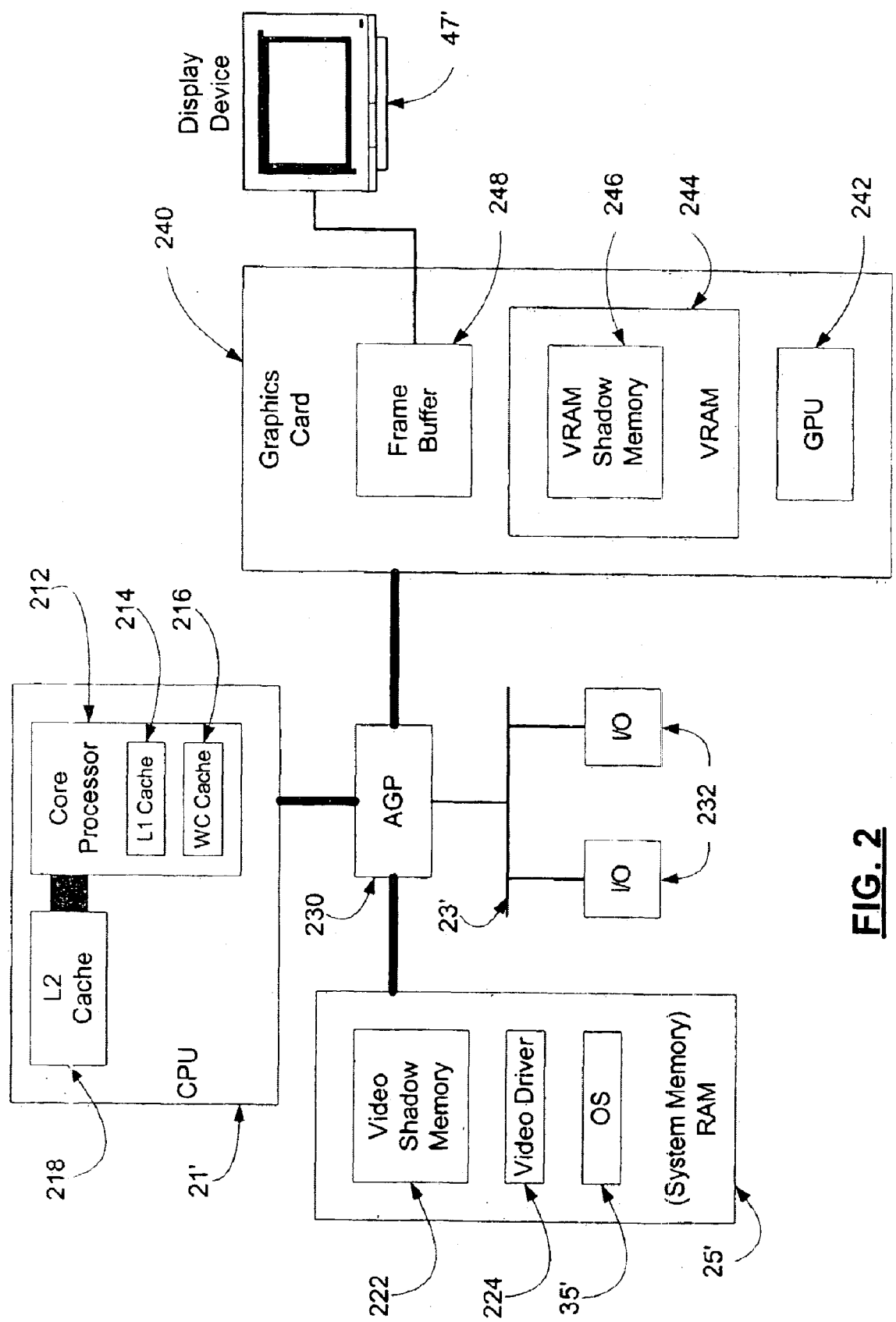
FIG. 2 is a block diagram illustrating a typical computer subsystem for rendering graphics.

FIG. 2 is block diagram illustrating the various elements of a typical computer subsystem for rendering graphics which various embodiments of the present invention may utilize. The graphics processing subsystem comprises a central processing unit 21' that, in turn, comprises a core processor 212 having an on-chip L1 cache 214 and, in this embodiment, an on-chip write-combine (WC) cache 216. The core processor 212 is also directly connected to an L2 Cache 218. As well-known and appreciated by those of skill in the art, the CPU 21' accessing data and instructions in cache memory is much more efficient than having to access data and instructions in random access memory (RAM 25, referring to FIG. 1). The L1 cache 214 is usually built onto the microprocessor chip itself, e.g., the Intel MMX microprocessor comes with a 32 KB L1 cache. Some microprocessor chips—such as the "P6" family of chips from Intel—also include, as shown herein, a WC Cache 216 which enables the processor to batch together several write operations to consecutive memory addresses in order to improve performance. The L2 Cache 218, on the other hand, is usually on a separate chip (or possibly on an expansion card) but can still be accessed more quickly than RAM, and is usually larger than the L1 cache, e.g., one megabyte is a common size for a L2 Cache.

In contrast to the typical computer system illustrated in FIG. 1, the CPU 21' in the present drawing is then connected to an accelerated graphics port (AGP) 230. The AGP provides a point-to-point connection between the CPU 21', the system random access memory (RAM) 25', and graphics card 240, and further connects these three components to other input/output (I/O) devices 232—such as the hard disk drive 32, magnetic disk drive 34, network 53, and/or peripheral devices of FIG. 1—via a traditional system bus such as a PCI bus 23'. The presence of AGP also denotes that the computer system favors a system-to-video flow of data traffic—that is, that more traffic will flow from the CPU 21' and its system RAM 25' to the graphics card 240 than vice versa—because the AGP is typically designed to allow up to four times as much data to flow to the graphics card 240 than back from the graphics card 240.

The frame buffer 248 on the graphics card 240 is directly connected to the display device 47'. As well-known and appreciated by those of skill in the art, the frame buffer 248 is typically dual-ported memory that allows a processor (the GPU 242 or the CPU 21') to write a new or revised image to the frame buffer 248 while the display device 47' is simultaneously reading from the frame buffer 248 to refresh the current display content on the display device 47'.

For efficiency, the memory for the frame buffer 248 is aligned to match the pixel layout of the display device 47'—that is, the first pixel of the display device corresponds to the first four bytes of frame buffer memory (four bytes being the amount of memory required for one pixel in a true color graphic), the second pixel corresponds to the second four bytes of frame buffer memory, and so on and so forth. In general, the first pixel of a display device is located in the upper left-hand corner of the display, the second pixel is to the right of that, and so on to the last pixel of the line in the upper right-hand corner of the display which, in turn, is immediately followed by the first pixel in the second row (upper left-hand corner, second pixel from the top, first pixel from the left).

The system RAM 25' may comprise the operating system 35', a video driver 224, and video shadow memory (VSM) 222. The VSM, which is a mirror image of the frame buffer 248 on the graphics card 240, is the location in RAM 25' where the CPU 21' may construct graphic images and revisions to current graphics, and from where the CPU 21' may copy graphic images to the VRAM 244, the VRAMSM 246, or the frame buffer 248 of the graphics card 240 via the AGP 230. Certain embodiments of the present invention may have video rendering directly executed by the CPU 21' and the RAM 25'.

The graphics card 240 may comprise a graphics processing unit (GPU) 242, video random access memory (VRAM) 244, and the frame buffer 248. The VRAM 244 further comprises a VRAM shadow memory (VRAMSM) 246. The GPU 242 and VRAMSM 246 are specialized components for the specific purpose of rendering video. By offloading this functionality to the graphics card 240, the CPU 21' and VSM 222 are freed from these tasks. However, graphics cards generally lack a WC Cache and an L2 Cache, the former of which is deemed necessary by the existing art for efficiently rendering portrait-mode graphics to a landscape-oriented frame buffer, and the latter of which is necessary to practice the present invention for the reasons set forth later herein. Therefore, while certain alternative embodiments of the present invention may have video rendering directly executed by the components of the graphics card 240, such execution anticipates the graphics card possessing a GPU 242 with a WC Cache and an L2 Cache (or their equivalents), in which case the descriptions of the embodiments of the present invention described herein can be readily applied to such a GPU and, as such, such alternative embodiments are fully anticipated by the disclosure herein.

Alternative-Oriented Graphics Remapping

On some computer systems, such as a Tablet PC, the display device 47' is physically orientable—that is, it can be viewed in the traditional landscape (horizontal) orientation, in a right-hand (primary) portrait (vertical) orientation (e.g., display rotated ninety degrees counterclockwise), in an inverted landscape (horizontal) orientation (e.g., display rotated one hundred eighty degrees counterclockwise), or in a left-hand (secondary) portrait (vertical) orientation. While the same can be said for any kind of computer monitor if it is physically reoriented, most monitors (e.g., monitor 47 of FIG. 1) are not well-suited to this kind of utilization (though such utilization is certainly anticipated by the embodiments of the invention discussed herein). In contrast to typical monitors, some computer systems, for example a Tablet PC, have physically orientable display devices to compliment and extend the usability of the computer system. For example, when a Tablet PC is docked in a base station it might be advantageous to a user to have the traditional landscape-oriented graphical display on the display device 47', but when reading text (for example, a virtual book) on the Tablet PC (undocked) while sitting comfortably in a chair, it might be advantageous for the user to have a portrait-oriented graphical display on the display device 47'.

In regard to physical portrait orientation of the display device, however, it is important to note that changing the physical orientation of a display device itself (e.g., turning it on its side) in no way changes the operation of the display device 47' or the frame buffer 248, and so re-orienting the image on the display device 47' to correspond with the physical orientation must also be done. The challenge here is that the image in memory (e.g., RAM 25') is rendered with an alternate orientation.

Figure 3A:
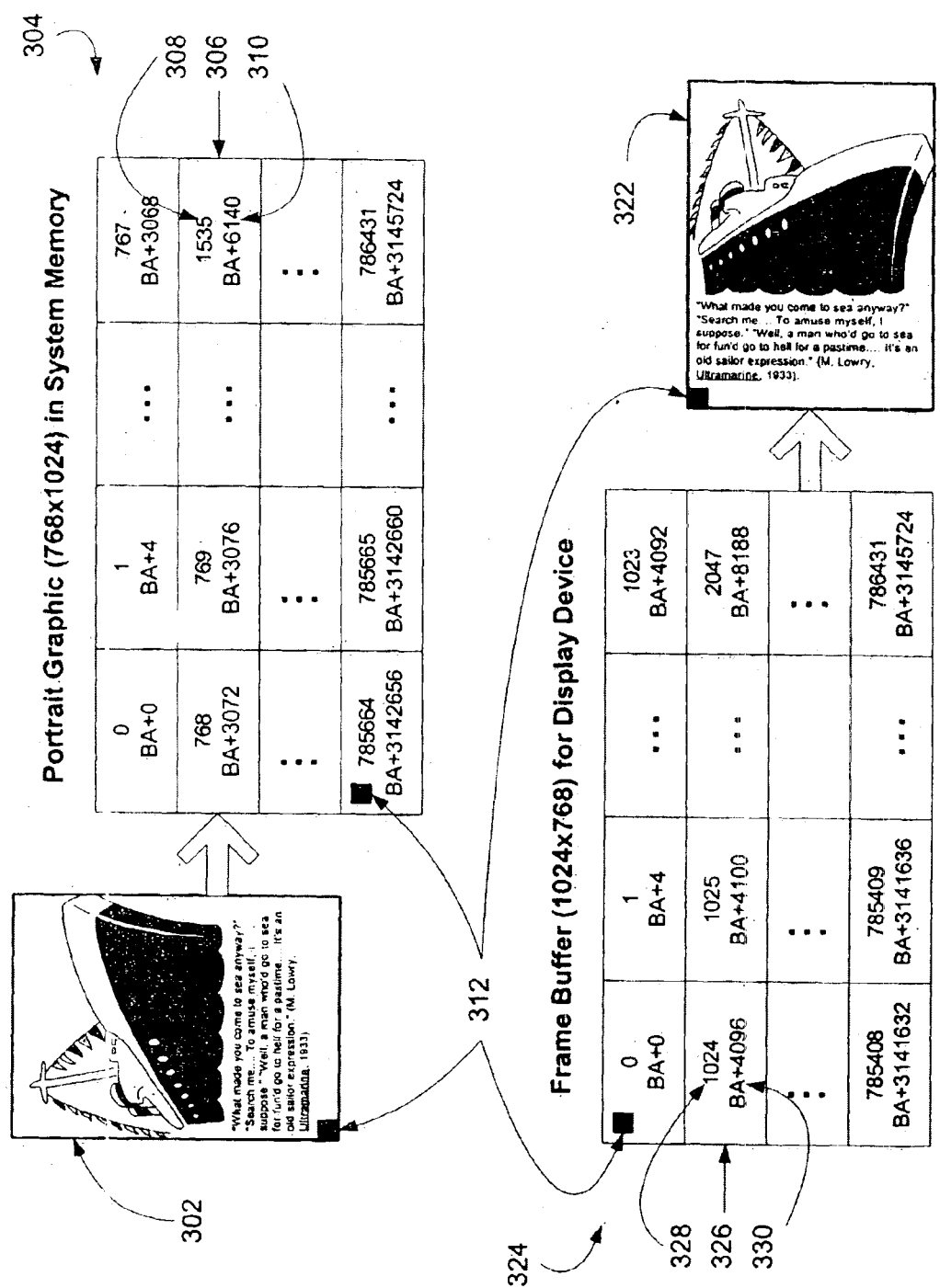
FIG. 3A is a block diagram illustrating a portrait-oriented full-screen graphic, its corresponding mapping in system memory, its memory mapping in a frame buffer, and its display on a display device.

For example, consider FIG. 3A which illustrates, for a 768×1024 (number of pixels in a horizontal row by the number of vertical rows) primary portrait display device (that is, a 1024×768 pixel landscape display device), a portrait-oriented full-screen graphic 302 and its corresponding mapping in memory 304 (e.g., RAM 25'). Each grid square element (e.g. 306) of the memory map 304 has a graphic pixel number (e.g., 308) and a memory reference (e.g., 310). In memory, these pixels run from left to right (pixel 0 is located in the upper left-hand corner of the graphic 302), and rows of pixels run from top to bottom, corresponding with adjacent memory elements (wherein each memory element comprises four bytes of memory for a pixel comprising true color graphics, as previously mentioned). Thus, while the pixel reference numbers for this memory map 304 increment by one from left to right in rows running from top to bottom of the graphic 302, the memory references increment by four in a similar manner. Operating systems and applications programs both generally presume that adjacent pixels have adjacent memory element locations, and thus this portrait-oriented rendering of the portrait-oriented graphic necessary and beneficial.

FIG. 3A further illustrates the memory mapping 324 of a frame buffer 248 for a 1024×768 landscape display device 322 (which, again, is the immutable default orientation for frame buffer memory). Each grid square element (e.g. 326) of the frame buffer map 324 has a display pixel number (e.g., 328) and a memory reference (e.g., 330). For a display device 47', these locations in the frame buffer map correspond to pixels running from left to right on the display device 322 (pixel 0 located in the upper left-hand corner of the display device 322), and rows of pixels run from top to bottom, and thus adjacent display pixels correspond with adjacent memory elements in the frame buffer 248 (wherein, again, each memory element comprises four bytes of memory for a pixel comprising true color graphics). Thus, while the display pixel reference numbers for this frame buffer memory map 324 increment by one from left to right in rows running from top to bottom (akin to the pixel layout on the display device 47'), the memory references increment by four in a similar manner. Display devices and graphics cards both generally presume that adjacent frame buffer memory elements correspond to adjacent pixels on the display device.

Figure 3B:
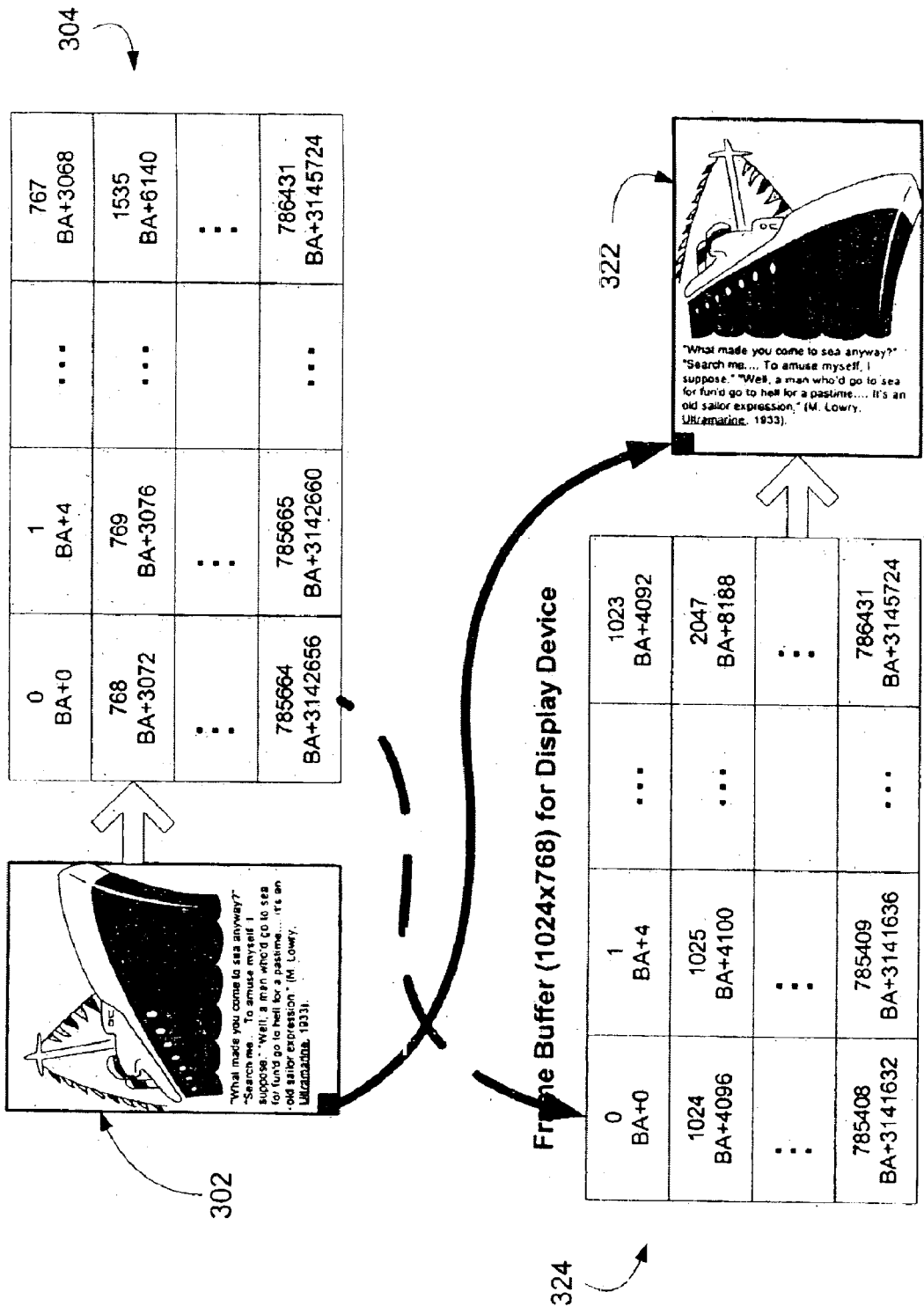
FIG. 3B is the block diagram of FIG. 3A further illustrating the need for a portrait-oriented graphic to be remapped to the landscape-oriented frame buffer.
Figure 3C:
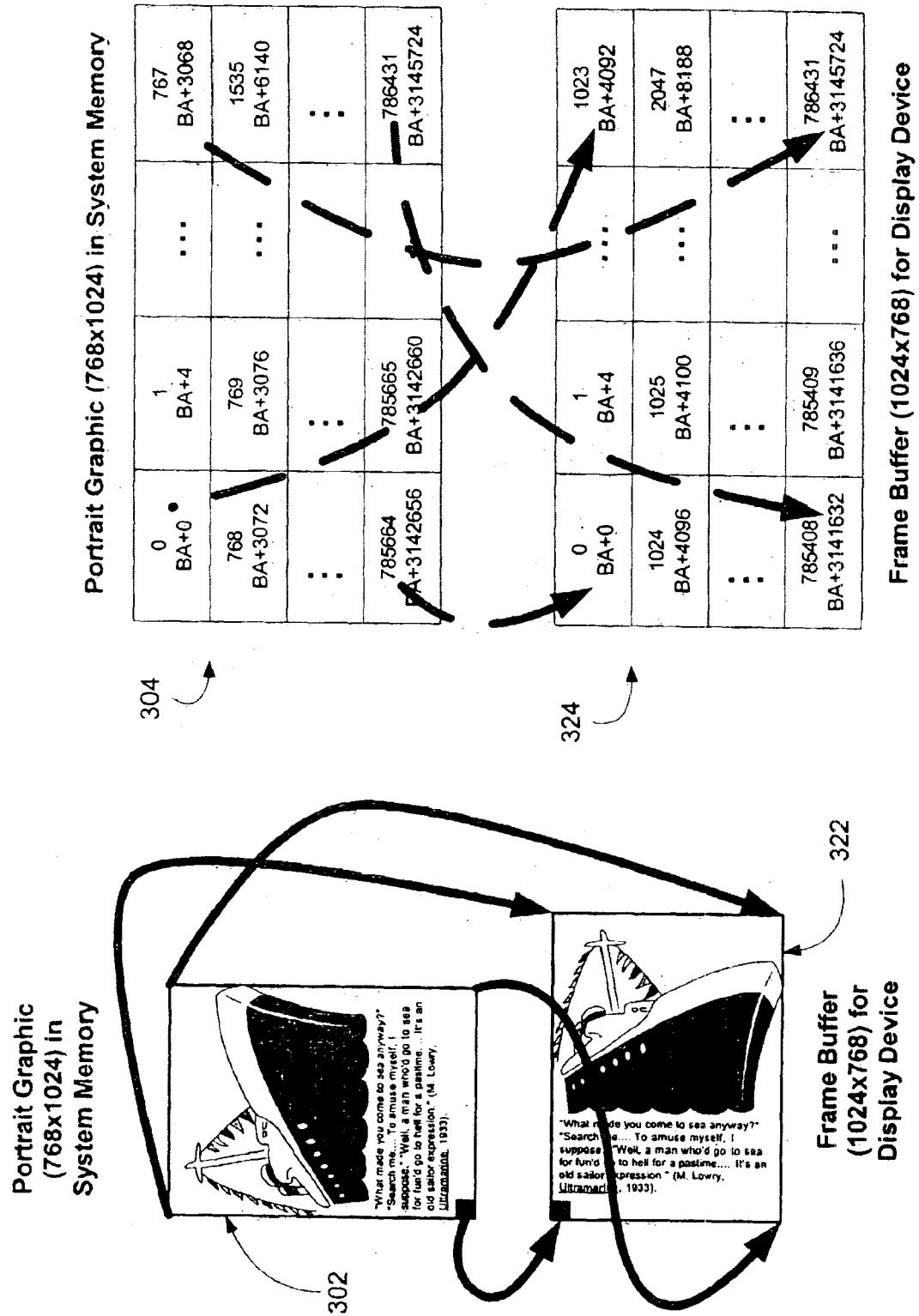
FIG. 3C is the block diagram of FIG. 3A showing the remapping of the four corners of the graphic from its native portrait-orientation to the frame buffer (and default display) landscape-orientation.

If the graphic is to be oriented in primary-portrait mode (on the default display device rotated ninety degrees counterclockwise), graphic reference pixel 312, in the lower left-hand corner of the graphic 302 and the memory map 304, as well as the upper left-hand corner of the display device 302 and the frame buffer memory map 324, refers to the same logical pixel for the graphic to be displayed. In other words—and referring now to FIG. 3B—by copying this pixel from its location in RAM 25' (as shown in the memory map 304) to the frame buffer memory map 324 (the first pixel memory location in the frame buffer 248), this pixel will correctly display on the display device 47'. By logically remapping the pixels in the system memory (RAM 25') to the frame buffer 248, as shown for the four corner pixels in FIG. 3C, the entire graphic 302 will be correctly copied to the display device 47'. The simple algorithms describing this remapping are well known to those skilled in the art.

Alternative-Oriented Graphics Processing

The Brute Force Approach and Simple L2 Cache Method

One approach to copying a portrait-oriented graphic from system memory (RAM 25') to the landscape-oriented frame buffer 248 is the simple brute force approach illustrated (for primary portrait display of a graphic) in FIG. 4.

In this and other figures, each unique pixel has a unique two-letter identifier that, for clarity, also illustratively refers to the pixel's row and column destination in the frame buffer 248 for a primary portrait display. Moreover, for the sake of convenience and consistency, hereinafter all references to portrait orientation presume a primary portrait orientation unless stated otherwise, although the need for remapping and the methods described herein would apply equally well to a secondary portrait display as will be understood and appreciated by those of skill in the art.

Using the brute force approach, the CPU 21' copies each pixel in RAM 25' (e.g., pixel AZ in row a, column a of RAM 25'), in any order, to its corresponding location in the frame buffer 248 (row a, column z, as shown). This brute force method can also be employed by the GPU 242 of a graphics card 240 to copy a portrait-oriented image in VRAM 244 (presumably from VRAMSM 246) to the frame buffer 248. However, regardless of processor used, this method is extremely slow because, for each pixel copied (e.g., pixel YY), the processor (CPU 21' or GPU 242) must read from memory (RAM 25' or VRAM 244)—which is a slow operation—and then write to the frame buffer 248—which is an even slower operation. For example, if, for the sake of convenience, we presume that a "slow operation" is the period of time it takes a processor (CPU 21' or GPU 242) to read a pixel from memory (RAM 25' or VRAM 244), and if we again, for the sake of convenience, further presume that it takes twice as long (two "slow operations") for a processor (CPU 21' or GPU 242) to write a pixel to the frame buffer 248, then, for a 768×1024 graphic, this method executes the equivalent of approximately 2.4 million slow operations. This significantly impacts the performance of the display device operating in portrait mode.

Another method for optimizing the rendering of portrait-oriented graphics is to exploit the capabilities of the L2 Cache 218, as illustrated in FIG. 5. By combining the brute force method with the simple method of traversing the VSM 222 in system memory (RAM 25') linearly (that is, processing consecutive pixels in RAM 25' in order from first (AZ) to last (ZA)) as illustrated in FIG. 5, a CPU 21' could copy all of the pixels (e.g., pixel AZ) in portrait-oriented graphic—from left to right in rows from top to bottom in RAM 25'—to the display device 47'—from top to bottom in columns from right to left in the frame buffer 248—this can reduce the number of slow operation reads needed by the CPU 21'.

As described earlier herein, and as well known and understood to those of skill in the art, when a CPU 21' reads a memory location from RAM 25', it actually loads an entire predefined block of memory (for example, 4096 bytes of memory per read) into the L2 Cache 218. For a pixel comprising four bytes, the CPU 21' likely needs to make only one read (not four for the four bytes that comprise a pixel), and when the CPU 21' processes pixels having consecutive memory locations it need only make roughly one read to RAM 25' to process 1024 pixels. Moreover, even a small L2 Cache, such as one having 128 KB of memory (or a larger cache simply using 128 KB of its memory), could store roughly 24 blocks at any one time, and these 24 blocks roughly equate to 32 rows of pixels in a 768×1024 graphic (or roughly 24 complete rows on a 1024×768 display device).

For a 768×1024 graphic, this method, utilized by a CPU 21', executes the equivalent of approximately 1.6 million slow operations, or approximately one-third fewer slow operations than the brute force method. (In contrast, a general GPU 242 utilizing this method would not realize this performance gain because of said GPU's lack of an L2 Cache 218 or its equivalent.) However, this method provides only roughly a 30% improvement over the brute force method and, as discussed below, this method, as such, requires nearly double the number of slow transactions compared to the write-combine method that currently dominates the art. Therefore, it is only natural that the simple L2 Cache method has been largely ignored in the present art.

The Write Combine Method

Figure 6:
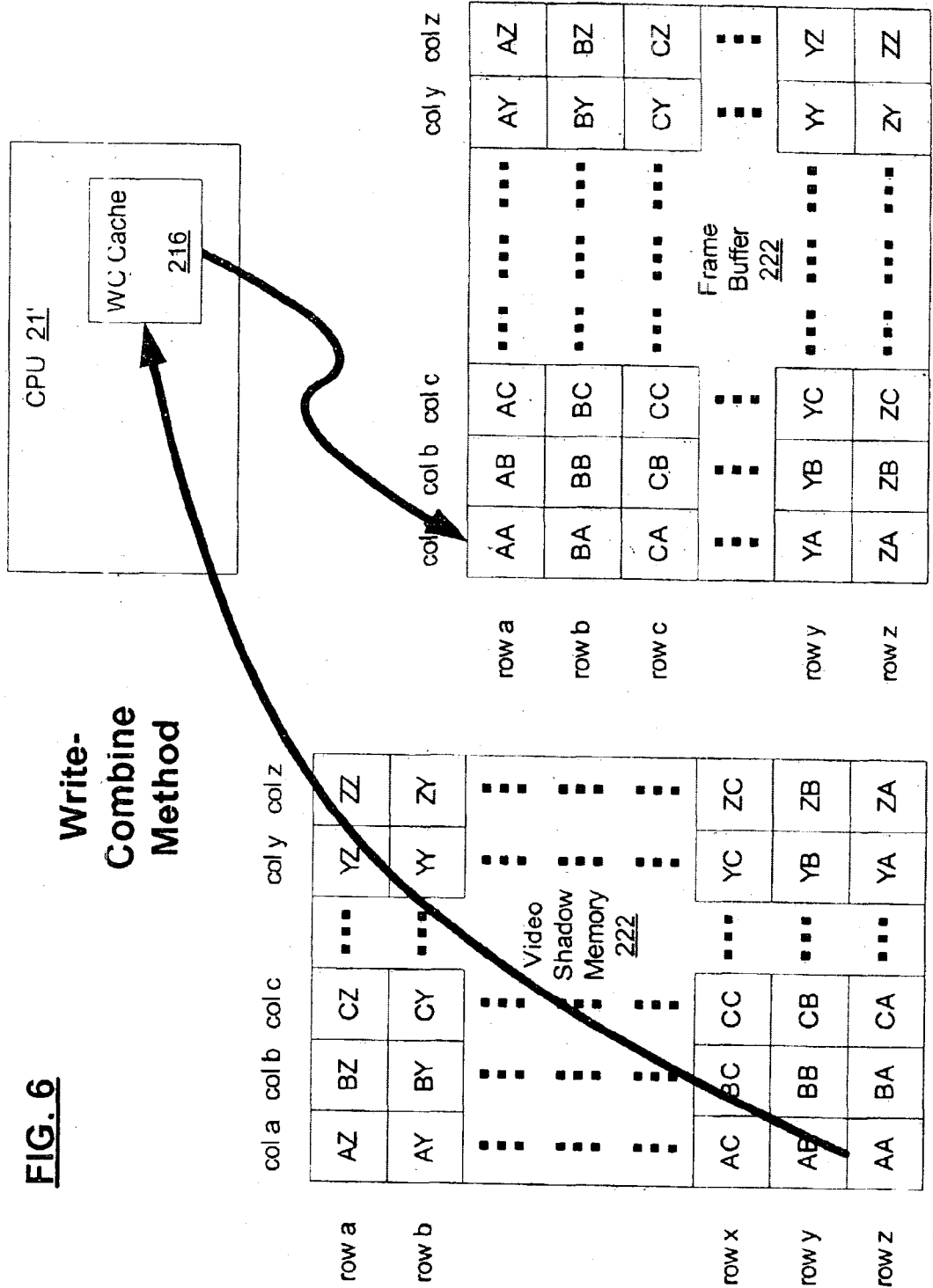
FIG. 6 is a block diagram illustrating the write-combine method of copying a portrait-oriented graphic from system memory to the landscape-oriented frame buffer.

To address the significant shortcomings of the brute force approach and to surpass in performance the simple L2 Cache method, the prevalent method in the art for remapping graphics rendered in system memory to the frame buffer, and as illustrated in FIG. 6, has been to utilize the write-combine (WC) cache 216 in order to accelerate the remapping of portrait-oriented graphics. When present, a WC Cache 216, as previously described herein, enables the CPU 21' to batch together several write operations to consecutive memory addresses in the frame buffer 248 (the target location). If we presume the WC Cache 216 has 4 KB of capacity, then the WC Cache can write 1024 pixels to the frame buffer in a single write operation. To employ this method, and as illustrated in FIG. 6, the CPU 21' reads 1024 pixels (e.g., pixels AA–AZ) from RAM 25' and then writes these pixels to the frame buffer 248 with a single write command. By minimizing the number of writes to the frame buffer 248—which is the sole focus of this method—this approach requires a total of less than eight hundred thousand slow operations to execute, which is nearly 70% less than required by the brute force approach and only half the number required by the simple L2 Cache method. (In contrast, a general GPU 242 utilizing this method would not realize this performance gain because of said GPU's lack of a WC Cache 216 or its equivalent.)

However, one important shortcoming in this prevalent write-combine method is that, in its quest to maximally exploit the WC Cache 216, the write-combine method completely ignores the L2 Cache and, consequently, it is the L2 Cache that becomes the bottleneck for the graphic copying process as illustrated in FIGS. 7A–7E.

Figure 7A:
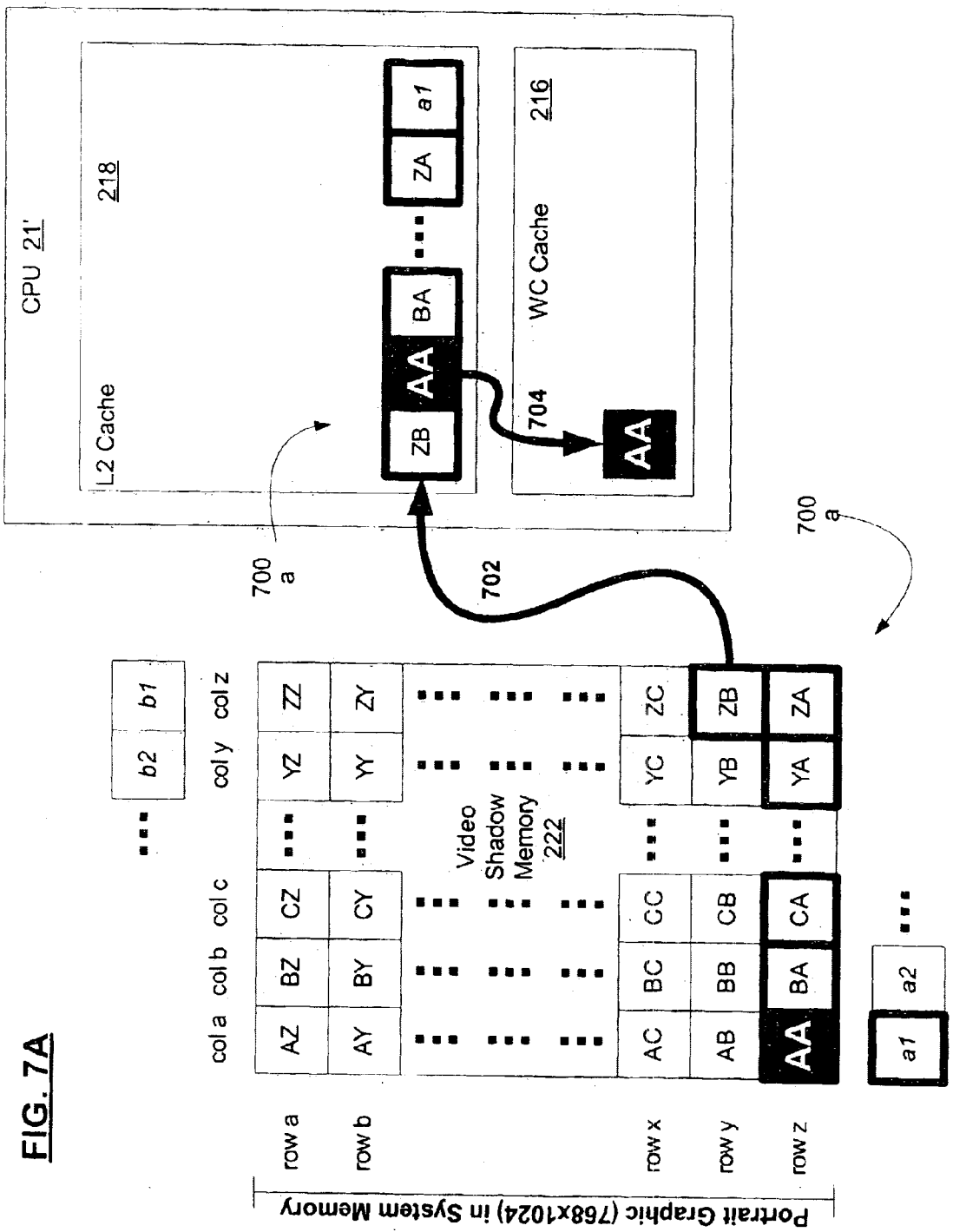
FIG. 7A is a block diagram illustrating the operation of the write-combine method wherein a first pixel (AA) is read by the CPU.

In FIG. 7A, which illustrates a first pixel (AA) that is read by the CPU 21' using the write-combine method for copying to pixel to the frame buffer 248 via the WC Cache 216, it should be noted that, when CPU 21' reads the memory location from RAM 25' corresponding to AA, the CPU 21' first checks the L2 Cache to see if pixel AA is available for immediate processing. Since it is not, the CPU 21' then reads pixel AA from RAM 25' and, as with any read to RAM 25', the L2 Cache 218 is automatically loaded 702 with an entire predefined block of memory 700a that corresponds to pixel AA (e.g., pixel ZB through ZA as well as, in this particular case, non-pixel memory block a1 that immediately follows the last pixel ZA and which just happens to be part of the predefined block read into the L2 Cache 218, given that chances are good that the predefined blocks for L2 caching do not necessarily line up with the boundaries of the VSM 222). As known and understood by those of skill in the art, this block 700a of memory will now reside in the L2 Cache 218 until it is pushed out when other blocks are dropped into the L2 Cache 218 and the L2 Cache 218 no longer has enough capacity to keep this particular block. (In other words, when the L2 Cache has no more storage space, the "oldest" block—that is, the block that has not been referenced in the longest time—is dropped out of the L2 Cache to make room for the newest block.)

Pixel AA, meanwhile, although continuing to reside in the L2 Cache 218 until pushed out, has been immediately cached 704 by the CPU 21' into the WC Cache 216, the latter of which, in turn, buffers pixel AA and waits for the next write command to and see if it is for a pixel in a consecutive memory block in the target location (the frame buffer 248) and, if so, the WC Cache 216, by its own inherent functionality, will combine this and all other such consecutive memory pixels (up until a non-consecutive memory cell arrives or the WC buffer is full) and then write the entire combination of consecutive pixels (representing consecutive memory locations in the destination) to the frame buffer 248 with a single command (as discussed earlier herein).

Figure 7B:
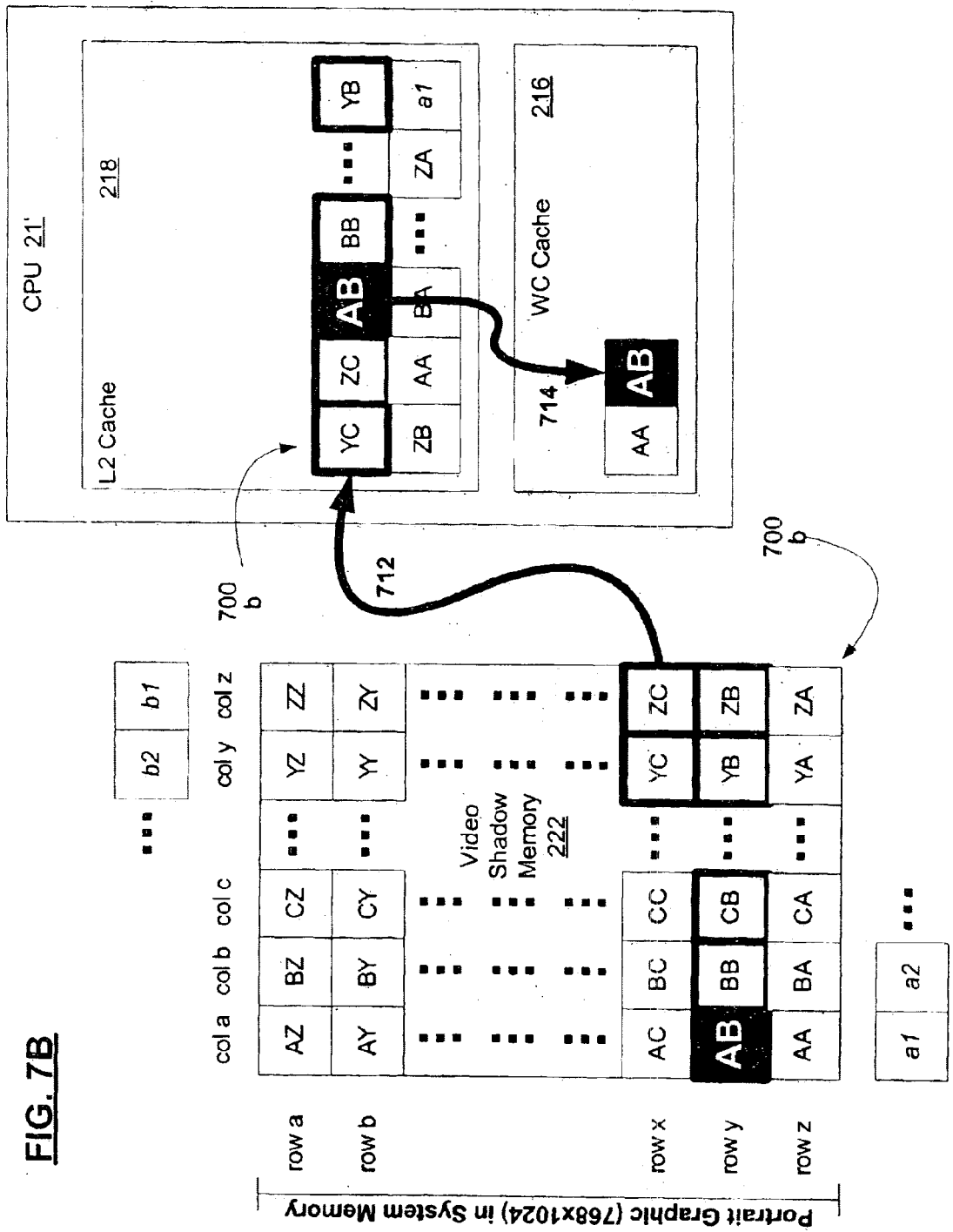
FIG. 7B is a block diagram illustrating the operation of the write-combine method wherein a second pixel (AB) is read by the CPU.
Figure 7C:
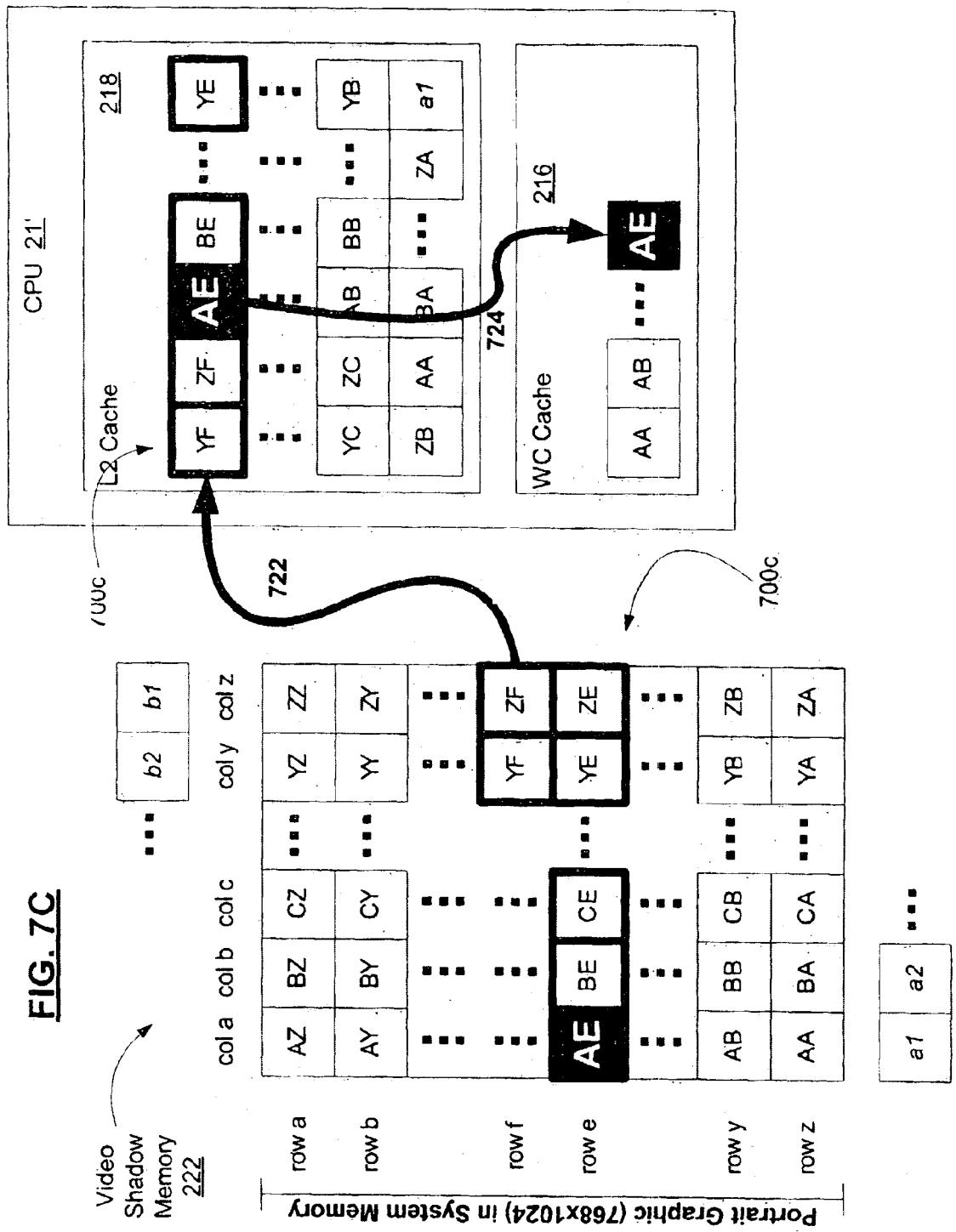
FIG. 7C is a block diagram illustrating the operation of the write-combine method wherein an nth pixel (AE) is read by the CPU and the L2 cache becomes "full"
Figure 7E:
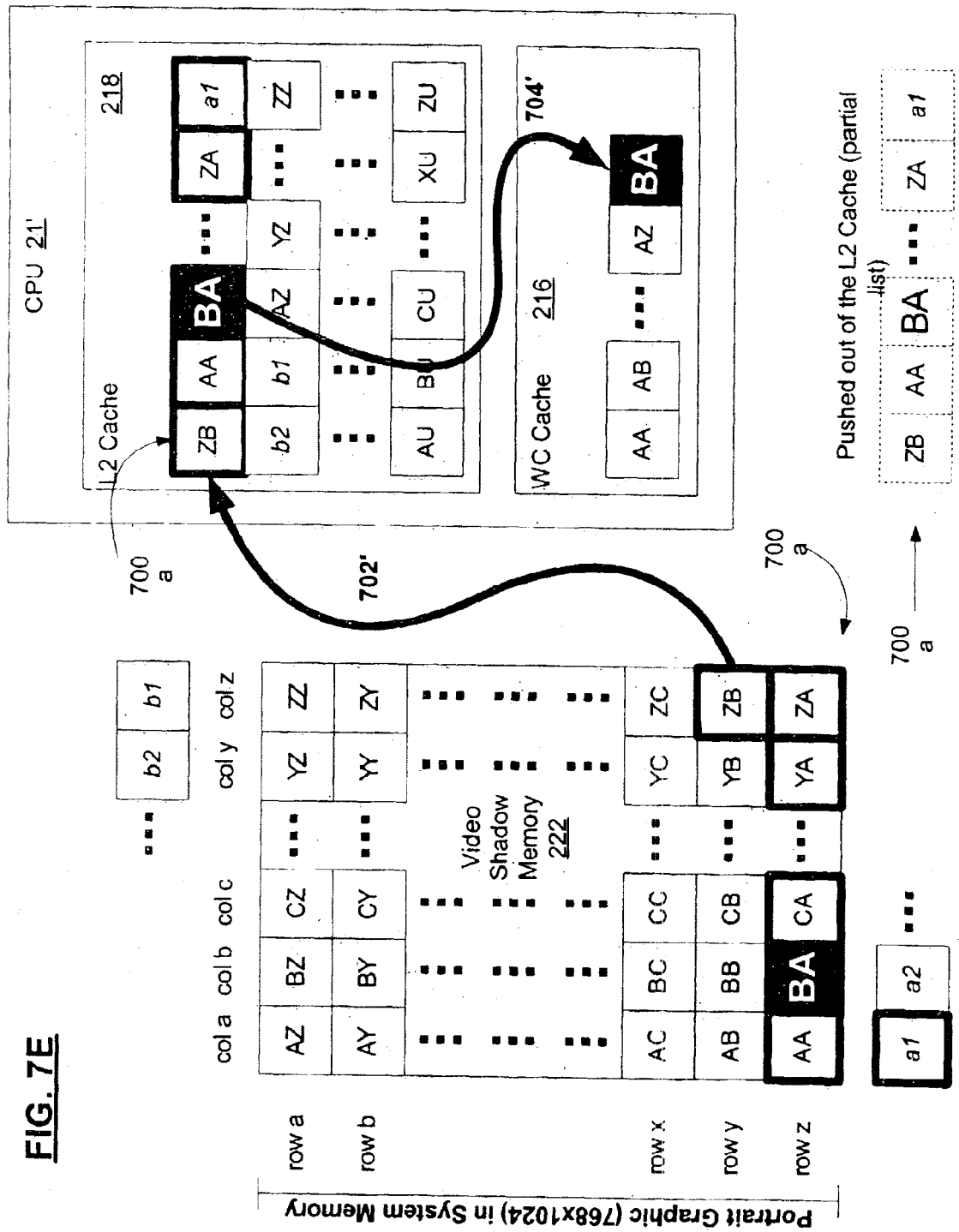
FIG. 7E is a block diagram illustrating the operation of the write-combine method wherein the first pixel in the second column (BA) is read by the CPU and requires the reloading of the first block back into the L2 Cache.

After pixel AA is cached, the CPU 21', as illustrated in FIG. 7B, then reads the second pixel AB and, by inherent functionality, the entire memory block 700b to which pixel AB belongs is loaded 712 into the L2 Cache 218 and pixel AB is cached 714 into the WC Cache 216. This process of reading blocks and caching consecutive-memory pixels continues until the L2 Cache 218 is full of pixel memory blocks as illustrated in FIG. 7C which, as shown, follows the loading 722 of pixel AE's memory block 700c into the L2 Cache 218 and the caching 724 of pixel AE into the WC Cache. This "full" condition may be the result of a physical limitation (i.e., the unavailability of additional memory in the L2 Cache 218) or may instead be the result of a predefined limit on the amount of space in the L2 Cache that has been allocated to storing graphics information (such as, in the present embodiment, 128 MB of memory in the L2 Cache) In any event, when pixel AF is read by the CPU 21', as illustrated in FIG. 7D, the block of memory 700d corresponding to pixel AE is loaded into the L2 Cache 218 by pushing out block 700a (which, as denoted by the dashed lines, no longer exists in the L2 Cache 248).

As the process continues, and after the CPU reads and caches the last pixel in column a, (pixel AZ), the CPU, as illustrated in FIG. 7D, then seeks to read pixel BA from the L2 Cache but, for the reasons illustrated back in FIG. 7C, pixel BA no longer exists in the L2 Cache and thus another slow operation read to RAM 25' is necessary to, reload 702' pixel BA (and its corresponding block 700a) back into the L2 Cache 218 in order to cache 718 pixel BA into the WC Cache 216. The same is true for pixel BB, BC, and so on and so forth until the CPU 21' finishes reading the entire graphic from the VSM 222 in RAM 25' (ending with pixel ZZ).

Figure 8B:
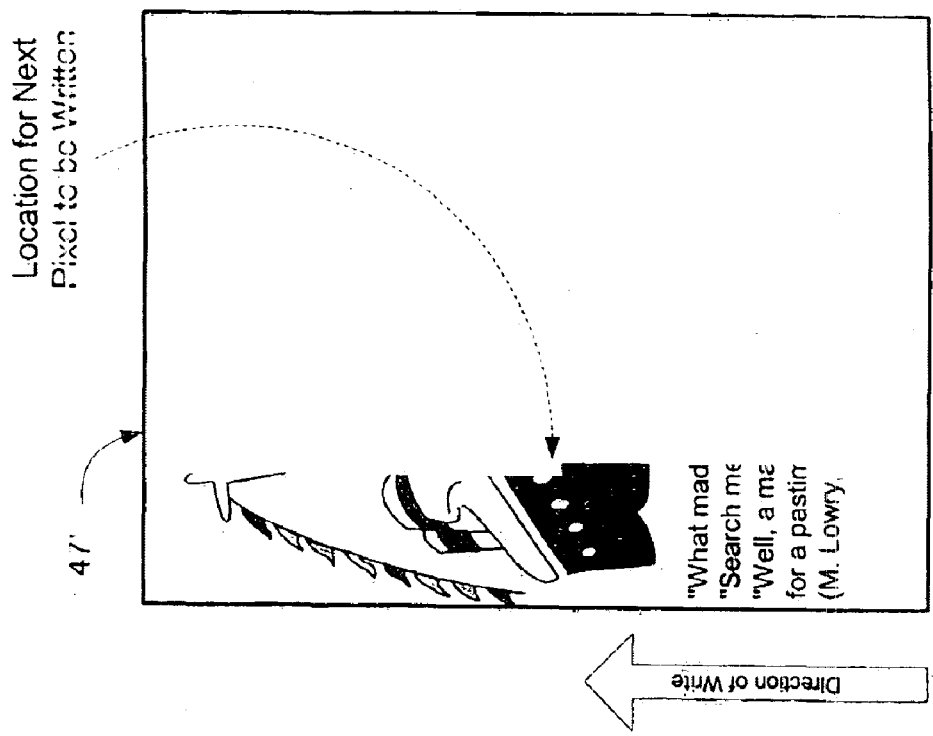
FIG. 8B is a logical representation of a display on a display device in a portrait orientation corresponding to the portrait-orientation of the graphic being displayed ("portrait graphic") as displayed using the write-combine method.
Figure 8A:
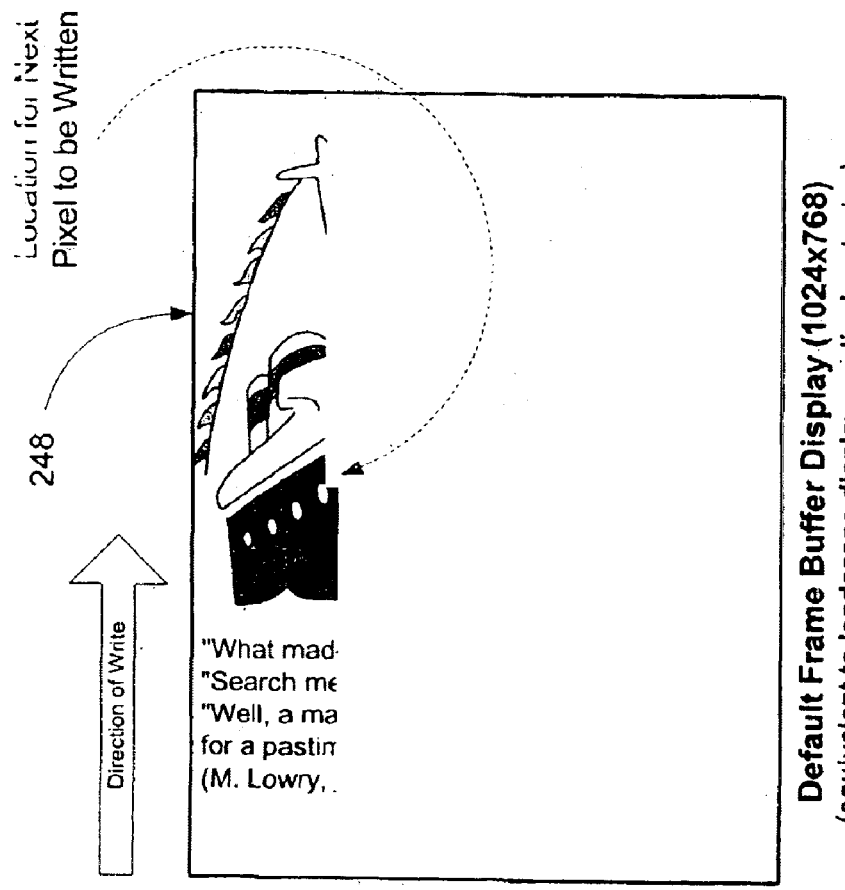
FIG. 8A is a logical representation of a display on a display device in a landscape orientation to mirror the memory arrangement of the landscape-oriented frame buffer ("default frame buffer display") as displayed using the write-combine method.
Figure 8C:
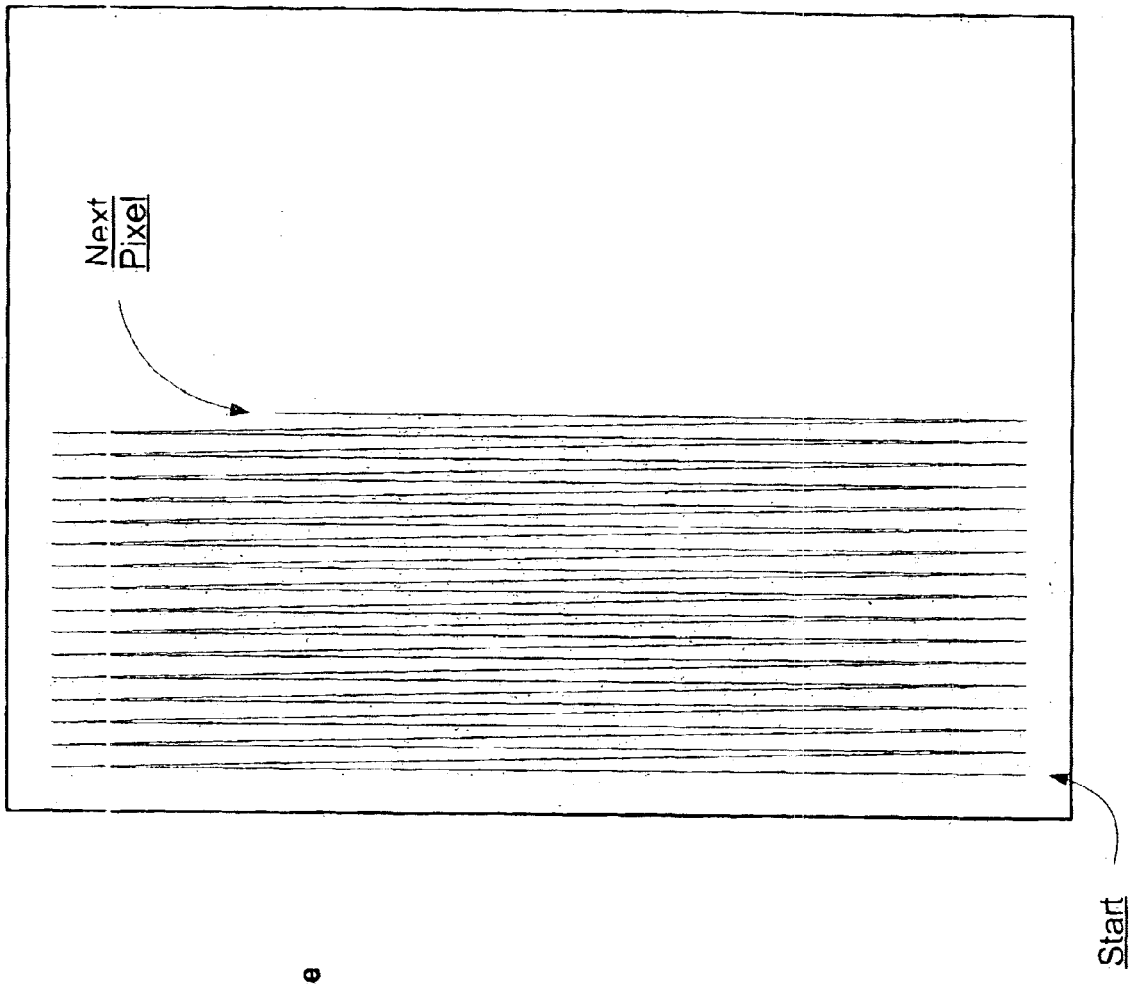
FIG. 8C is a block diagram illustrating the rasterized pattern of the pixels as drawn (by the write-combine method) on the display device in a portrait orientation.

As can be seen—and except for the relatively few fortuitous instances where a block of memory happens to have two vertically consecutive pixels—the contents of the L2 Cache are not leveraged and each pixel must therefore be loaded from RAM 25' in order to maximize the WC Cache 216 write-combine capability and thereby minimize the number of writes to the frame buffer 248. Nevertheless, as illustrated in FIG. 8A, these pixels are written to the frame buffer 248 in consecutive order that, with a large enough WC Cache, could be achieved with one single write command (although one embodiment might presume a WC Cache of 4 MB, in which case 768 write-combine writes are necessary). Regardless of the number of write commands, however, the method effectively paints each pixel from left to right in rows running from top to bottom on the display device (in its native landscape orientation) so that, viewed as a portrait display, the graphic, as illustrated in FIG. 8B, is drawn on the display device from bottom to top in column running from left to right. FIG. 8C shows the rasterized pattern of the pixels as drawn on the display device 47' in a portrait orientation.

Yet despite cutting the number of slow operations to one third of those necessary for the brute force approach, even the write-combine method is too slow to adequately render portrait-oriented graphics to a landscape-hardwired display devices at the speeds required to make rendering portrait-oriented graphics resemble landscape-oriented graphics—a shortcoming in the art that heretofore has not been adequately addressed. However, various embodiments of the present invention employ methods that reduce the number of slow operations less than a mere 2% of those required by the brute force method and only 6% as many as required by the write-combine method.

The Dual-Cache Method

Various embodiments of the present invention, by exploiting both the L2 Cache 218 and the WC Cache 216, significantly reduce the number of slow operations required to copy a portrait-oriented graph rendered in RAM 25' to the frame buffer 248 much more effectively and efficiently that possible with the write-combine method. In one embodiment of the present invention, as illustrated by FIG. 9, the dual-cache method focusing on optimizing the operation of both the L2 Cache 218 and the W2 Cache 216 in order to eliminate unnecessary process bottlenecks like that apparent in the L2 cache of the write-combine method.

In the present embodiment, and in reference to FIGS. 7A–7C, the method of the invention is to initially load the initial pixels (e.g., pixels AA–AE) and their corresponding memory blocks (702a–c) into the L2 Cache 218— presumably filling memory specifically allocated in the L2 Cache 218 (again, in this embodiment, totaling 128 MB) for the sole purpose of copying this graphic to the frame buffer, although alternative embodiments may adopt a different approach—and these pixels are cached in the WC Cache 216.

Then, given that the L2 Cache is now "full"—and instead of reading the next block (700d in FIG. 7D) from RAM 25' to the L2 Cache 218 and push out the first block 700a—the CPU 21' of the present embodiment, as illustrated in FIG. 10A, next caches 1012 pixel BA directly from the L2 Cache 218 to the WC Cache 216 without having to load a memory block from RAM 25'. Of course, because pixel BA is not being written to consecutive target memory in the frame buffer 248, the WC Cache 216 immediately writes 1014 the first group of pixels (sub-column AA to AE) to the frame buffer 248. The CPU 21', as illustrated in FIG. 10B, then caches 1022 pixel BB directly from the L2 Cache 218 to the WC Cache 216, again without having to load a memory block from RAM 25', but this time no WC Cache 216 write to the frame buffer 248 is required either (that is, no slow operations for processing pixel BB). The CPU 21' continues to cache pixels from the L2 Cache 218 to the WC Cache 216 in this manner (e.g., pixels BC and BD), returns to the first block 700a of the next column after reading the last block 700d of each sub-column in the L2 Cache 218, after each of which the WC Cache 216 writes its current group of pixels (the current sub-column) to the frame buffer 248. The CPU 21' continues until all of the pixels in the blocks currently loaded in the L2 cache (said blocks comprising a "band" of pixels) have been processed and the CPU 21' then restart this process to load the next band of pixels into the L2 Cache 218 to fully process this second band before moving on to load the third band, and so on and so forth until the entire graphic has been processed.

Figure 11B:
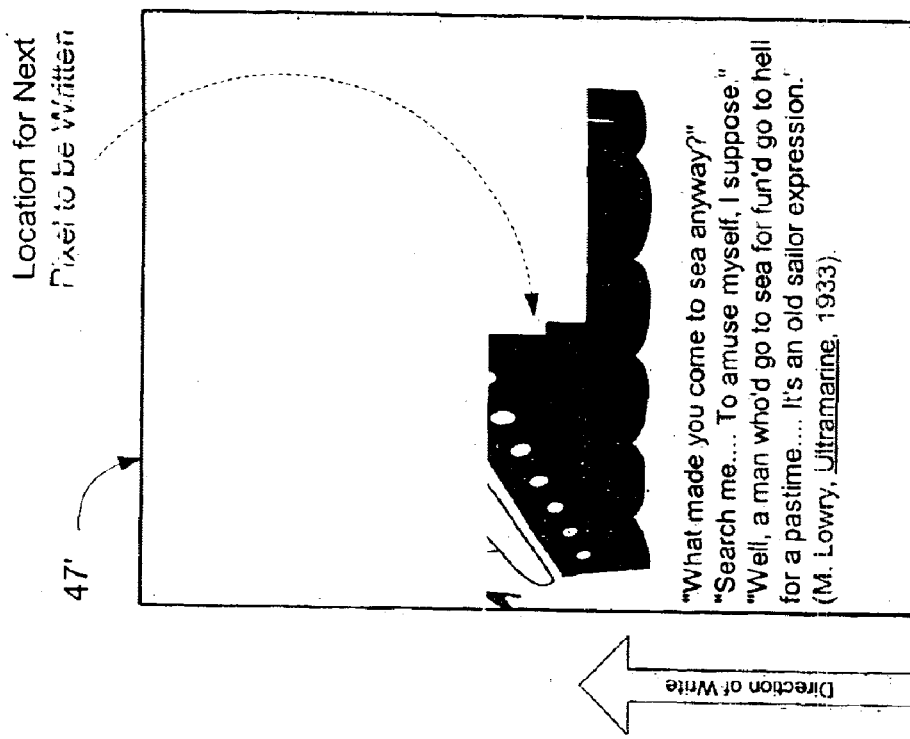
FIG. 11B is a logical representation of a display on a display device in a portrait orientation corresponding to the portrait-orientation of the graphic being displayed ("portrait graphic") as displayed using the dual-cache method.
Figure 11A:
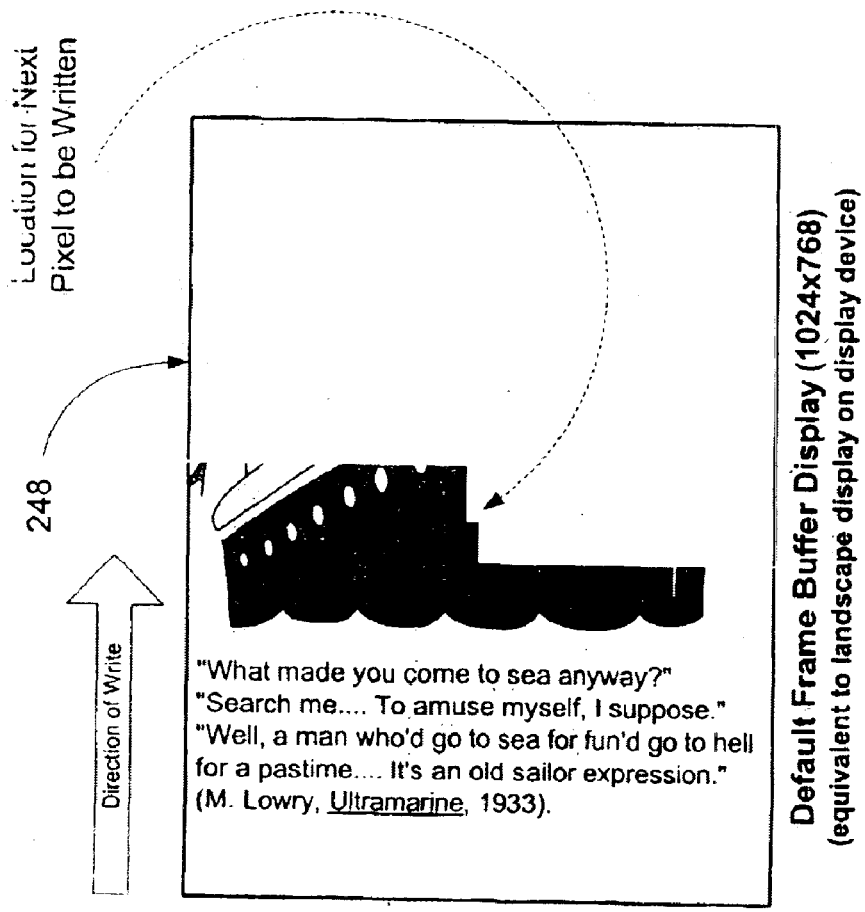
FIG. 11A is a logical representation of a display on a display device in a landscape orientation to mirror the memory arrangement of the landscape-oriented frame buffer ("default frame buffer display") as displayed using the dual-cache method.

As illustrated in FIGS. 11A and 11B—and in contrast to the line by line writing and display of pixels to the frame buffer 248 and display device 47' of FIG. 9A and FIG. 9B respectively—the present method writes the pixels to the frame buffer from left to write in bands (here, narrow vertical columns running from top to bottom and arranged from left to right as shown in FIG. 11A) to produce the graphic on the display device as horizontal bands (written pixel by pixel from bottom to top in each band running from left to right for the portrait-oriented image as shown in FIG. 11B). FIG. 11C shows the rasterized pattern of the pixels as drawn on the display device 47' in a portrait orientation.

In this and other alternative embodiments of the present invention, the dual-cache method drastically reduces the number of L2 Cache 218 loads from RAM 25' while, comparatively speaking, only incrementally increasing the number of WC Cache 216 writes to the frame buffer 248. As illustrated by the matrix of FIG. 12, which provides some rough estimates of performance gains based on the "slow operation" presumptions used herein, this tradeoff of WC Cache 216 maximization for balanced dual-cache utilization is quite favorable indeed as the method of the present invention only requires roughly fifty thousand slow operations—again, approximately 2% the number required by the brute force method and 6% of the number required by the write-combine method and provides graphic display speeds comparable to that of a native graphics card 240 rendering a standard landscape display in VRAM. Moreover, the present method works equally well for landscape displays rendered in RAM (that is, the transferring of landscape displays rendered in RAM 25' to the frame buffer 248) and, given its comparable performance, the method effectively negates the need for the GPU altogether for graphics that are more beneficially rendered in system memory.

Figure 13:
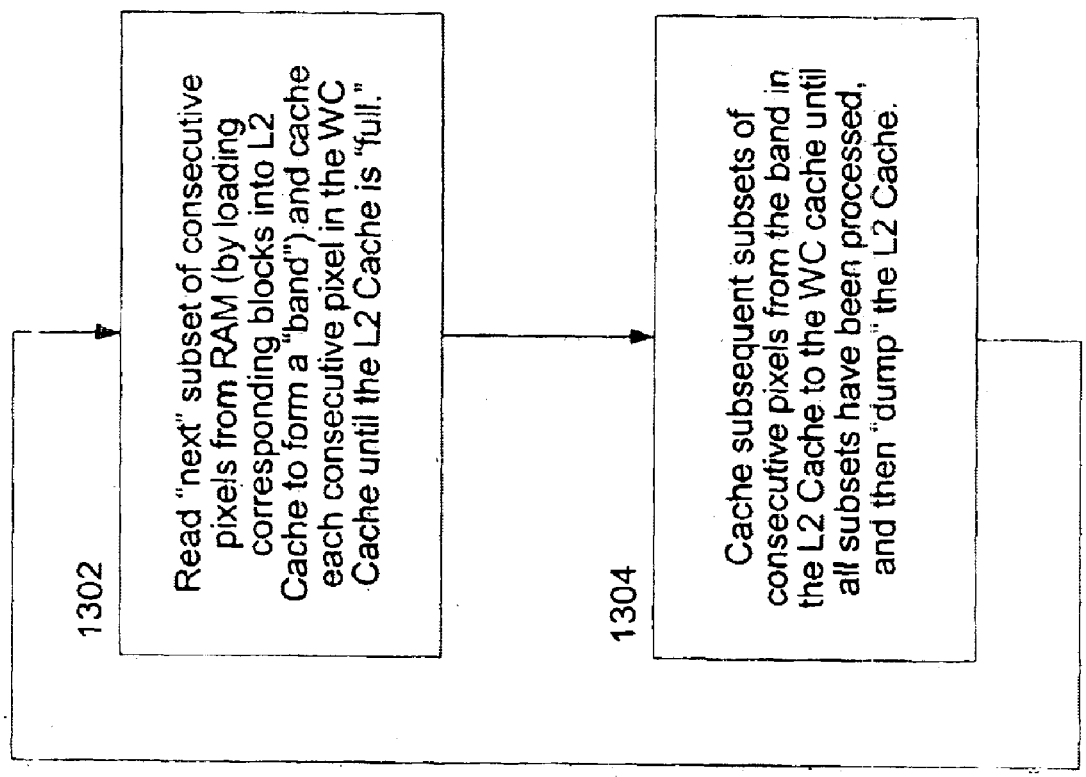
FIG. 13 is flowchart illustrating the method of one embodiment of the invention in its simplest form.

In its simplest form, the method of the present embodiment of the invention is reflected in the simple conceptual flowchart of FIG. 13. The first step, at 1302, is for the CPU 21' to read the "next" subset of consecutive pixels (which, initially, is the first subset of consecutive pixels) from RAM 25' and cache each such pixel in the WC Cache 216. This "read" operation, in turn, automatically results in the loading of these pixels' corresponding blocks into the L2 Cache 218. These reads and loads continue until the capacity of the L2 Cache is reached (either the physical space or the space allocated specifically for graphics blocks is filled) and these blocks thus loaded together forming a vertical "band" of pixels when drawn on the screen of the display device 41'. Once the L2 Cache is "full" with a plurality of blocks comprising a single band, the processor, at step 1304, then iteratively processes the next pixels out of each block until the entire band has been written to the frame buffer 248 via the WC Cache 216. Once this is complete, the process then "dumps" the L2 Cache (that is, it ignores the existing blocks and allows them to be naturally pushed out with subsequent loads) and, returning to step 1302, the next band of consecutive pixels is read (and their blocks loaded). When initialized, the "next" subset is the first subset, and when the last subset is processed, the "next" subset may be the first subset again when the graphic is updated or some other event occurs that requires a whole new reload of the graphic as will be appreciated by those of skill in the art.

The foregoing description has presumed a primary portrait orientation though, again, the need for remapping and the methods of the various embodiments of the present invention described herein would apply equally well to a secondary portrait display as will be understood and appreciated by those of skill in the art. Moreover, the present method may also be effectively utilized for rendering graphics in an inverse landscape mode as well as the default landscape mode (thus requiring only one methodology, although different remapping (if any), for all four possible orientations), although only the former (inverse landscape mode) requires pixel remapping whereas the latter (default landscape mode) is already properly mapped.

Conclusion

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed:

1. A method for copying a portrait-oriented graphic in a system memory to a landscape-oriented frame buffer for portrait-oriented display on a default landscape-oriented display device, said method comprising the steps of:

reading a first plurality of blocks from the system memory into an L2 cache, said plurality of blocks comprising:
a first plurality of pixels, comprising a sub-column of vertical pixels in the graphic, said first plurality of pixels to reside in consecutive memory locations of the frame buffer; and
a second plurality of pixels, comprising a sub-column of vertical pixels in the graphic adjacent to the first plurality of pixels, said second plurality of pixels to reside in consecutive memory locations of the frame buffer;

writing said first plurality of pixels to the frame buffer via a write-combine cache; and writing said second plurality of pixels to the frame buffer via the write-combine cache.

2. The method of claim 1 wherein said plurality of blocks further comprising at least one additional plurality of pixels, each such plurality of pixels comprising a sub-column of vertical pixels in the graphic, each said plurality of pixels to reside in consecutive memory location of the frame buffer, said method further comprising writing each such plurality of pixels to the frame buffer via the write-combine cache.

3. The method of claim 2 wherein all pixels in all of said pluralities of pixels are written to the frame buffer via the write-combine cache using said method.

4. The method of claim 3 further comprising:

reading a second plurality of blocks from the system memory into the L2 cache, said plurality of blocks comprising at least one plurality of pixels, each such plurality of pixels comprising sub-columns of vertical pixels in the graphic, each said plurality of pixels to reside in consecutive memory location of the frame buffer; and writing each such plurality of pixels to the frame buffer via the write-combine cache.

5. The method of claim 4 further comprising:
reading at least one additional plurality of blocks from the system memory into the L2 cache, each of said plurality of blocks comprising at least one plurality of pixels, each such plurality of pixels comprising sub-columns of vertical pixels in the graphic, each said plurality of pixels to reside in consecutive memory location of the frame buffer; and
for each such plurality of blocks, writing each such plurality of pixels to the frame buffer via the write-combine cache.

6. The method of claim 5 wherein all pixels in said portrait-oriented graphic are written to the frame buffer via the write-combine cache using said method.

7. The method of claim 5 wherein said portrait-oriented graphic is displayed on the display device in a primary portrait mode.

8. The method of claim 5 wherein said portrait-oriented graphic is displayed on the display device in a primary portrait mode.

9. A system for copying a portrait-oriented graphic in a system memory to a landscape-oriented frame buffer for a default landscape-oriented display device, said system comprising:
a processor, said processor comprising an L2 cache and a write-combine cache;
a system memory coupled to said processor, said system memory comprising a portrait-oriented shadow memory;
a landscape-oriented frame buffer coupled to said processor; and
computer instructions for said processor to load a plurality of blocks comprising pixels from system memory into the L2 cache, process said pixels into two or more sub-columns comprising pixels that will be written to consecutive memory locations of the frame buffer, and write said sub-columns to a frame buffer via the write-combine cache.

10. The system of claim 9 further comprising:
a subsystem for reading a first plurality of blocks from the system memory into an L2 cache;
a subsystem for organizing at least one pixel sub-column, comprising pixels that will reside in consecutive memory locations of the frame buffer, to be written to said frame buff via the write-combine cache; and
a subsystem for writing said pixels sub-columns to the frame buffer via the write-combine cache.

11. The system of claim 9 wherein said computer instructions further comprising instructions for all pixels in all of said pluralities of pixels are written to the frame buffer via the write-combine cache using said method.

12. The system of claim 11 wherein said computer instructions further comprise instructions for reading a second plurality of blocks from the system memory into the L2 cache, said plurality of blocks comprising at least one plurality of pixels, each such plurality of pixels comprising sub-columns of vertical pixels in the graphic, each said plurality of pixels to reside in consecutive memory location of the frame buffer, and for writing each such plurality of pixels to the frame buffer via the write-combine cache.

13. The system of claim 12 wherein said computer instructions further comprise instructions for reading at least one additional plurality of blocks from the system memory into the L2 cache, each of said plurality of blocks comprising at least one plurality of pixels, each such plurality of pixels comprising sub-columns of vertical pixels in the graphic, each said plurality of pixels to reside in consecutive memory location of the frame buffer, and for each such plurality of blocks, writing each such plurality of pixels to the frame buffer via the write-combine cache.

14. The system of claim 13 wherein said computer instructions further comprising instructions for all pixels in said portrait-oriented graphic to be written to the frame buffer via the write-combine cache.

15. The system of claim 13 wherein said portrait-oriented graphic is displayed on the display device in a primary portrait mode.

16. The system of claim 13 wherein said portrait-oriented graphic is displayed on the display device in a primary portrait mode.

17. A computer-readable medium having computer-readable instructions for copying a portrait-oriented graphic in a system memory to a landscape-oriented frame buffer for a default landscape-oriented display device, said computer-readable instructions comprising:
instructions for reading a first plurality of blocks from the system memory into an L2 cache, said plurality of blocks comprising:
a first plurality of pixels, comprising a sub-column of vertical pixels in the graphic, said first plurality of pixels to reside in consecutive memory locations of the frame buffer; and
a second plurality of pixels, comprising a sub-column of pixels in the graphic adjacent to the first plurality of pixels, said second plurality of pixels to reside in consecutive memory locations of the frame buffer;
instructions for writing said first plurality of pixels to the frame buffer via a write-combine cache; and
instructions for writing said second plurality of pixels to the frame buffer via the write-combine cache.

18. The computer-readable medium of claim 17 wherein said plurality of blocks further comprising at least one additional plurality of pixels, each such plurality of pixels comprising a sub-column of vertical pixels in the graphic, each said plurality of pixels to reside in consecutive memory location of the frame buffer, and further comprising instructions for writing each such plurality of pixels to the frame buffer via the write-combine cache.

19. The computer-readable medium of claim 18 further comprising instructions for all pixels in all of said pluralities of pixels to be written to the frame buffer via the write-combine cache.

20. The computer-readable medium of claim 19 further comprising:
instructions for reading a second plurality of blocks from the system memory into the L2 cache, said plurality of blocks comprising at least one plurality of pixels, each such plurality of pixels comprising sub-columns of vertical pixels in the graphic, each said plurality of pixels to reside in consecutive memory location of the frame buffer; and
instructions for writing each such plurality of pixels to the frame buffer via the write-combine cache.

21. The computer-readable medium of claim 20 further comprising:
instructions for reading at least one additional plurality of blocks from the system memory into the L2 cache, each of said plurality of blocks comprising at least one plurality of pixels, each such plurality of pixels comprising sub-columns of vertical pixels in the graphic, each said plurality of pixels to reside in consecutive memory location of the frame buffer; and instructions for each such plurality of blocks, writing each such plurality of pixels to the frame buffer via the write-combine cache.

22. The computer-readable medium of claim 21 further comprising instructions for all pixels in said portrait-oriented graphic to be written to the frame buffer via the write-combine cache using said method.

23. The computer-readable medium of claim 21 further comprising instructions for rendering said portrait-oriented graphic in a primary portrait mode.

24. The computer-readable medium of claim 21 further comprising instructions for rendering said portrait-oriented graphic in a secondary portrait mode.

25. A system for copying a portrait-oriented graphic in a system memory to a landscape-oriented frame buffer for a default landscape-oriented display device, said system comprising:

means for loading a plurality of blocks of pixels (a band) into an L2 cache;

means for processing the band into sub-columns of pixels in the graphic having consecutive memory locations on the frame buffer; and means for writing said sub-columns of pixels to the graphic via a write-combine cache.

26. The system of claim 25 further comprising instructions for rendering said portrait-oriented graphic in a primary portrait mode.

27. The system of claim 25 further comprising instructions for rendering said portrait-oriented graphic in a secondary portrait mode.

28. A hardware device for copying a portrait-oriented graphic in a portrait-oriented first memory location to a landscape-oriented second memory location, said hardware device comprising:

a processor, said processor comprising an L2 cache and a write-combine cache;

a first memory coupled to said processor, said first memory having portrait-oriented addressing such that the pixels of the graphic, from left to right in rows running from top to bottom, are stored in consecutive memory locations in said first memory;

a second memory coupled to said processor, said second memory having landscape-oriented addressing such that the pixels of the graphic must be remapped;

computer instructions for said processor to load a plurality of blocks comprising pixels from said first memory into the L2 cache; process said pixels into two or more sub-columns comprising pixels that will be written to consecutive memory locations of the second memory, and write said sub-columns to said second memory via the write-combine cache.

29. The hardware device of claim 28 wherein said computer instructions further comprise instructions for rendering said portrait-oriented graphic in a primary portrait mode.

30. The hardware device of claim 28 wherein said computer instructions further comprise instructions for rendering said portrait-oriented graphic in a secondary portrait mode.

* * * * *

UNITED STATES PATENT AND TRADEMARK OFFICE
CERTIFICATE OF CORRECTION

PATENT NO. : 6,958,757 B2  Page 1 of 1
APPLICATION NO. : 10/623220
DATED : October 25, 2005
INVENTOR(S) : Donald David Karlov It is certified that error appears in the above-identified patent and that said Letters Patent is hereby corrected as shown below:

On Sheet 11 of 22, FIG. 7C (Near Box CPU 21'), line 1, delete " 700c " and insert -- 700c --, therefor.

On Sheet 14 of 22, FIG. 8B (Pointer to FIG. 8B), line 1, delete " 47' " and insert -- 47' --, therefor.

On Sheet 19 of 22, FIG. 11B (Box 47'), line 4, after "expression." delete """ and insert -- " --, therefor.

In column 10, line 61, after "Cache)" insert -- . --.

In column 11, line 4, after "necessary to" delete ",".

In column 15, line 46, in Claim 10, delete "buff" and insert -- buffer --, therefor.

In column 18, line 19, in Claim 28, after "cache" delete ";" and insert -- , --, therefor.

Signed and Sealed this

Twenty-eighth Day of July, 2009

JOHN DOLL
*Acting Director of the United States Patent and Trademark Office*